(12) United States Patent
Cheng et al.

(10) Patent No.: US 11,907,028 B2
(45) Date of Patent: Feb. 20, 2024

(54) PORTABLE ELECTRONIC DEVICE

(71) Applicants: Yu-Wen Cheng, Taipei (TW); Wei-Ning Chai, Taipei (TW); Ting-Wei Liu, Taipei (TW); Tzu-Yung Huang, Taipei (TW); Wang-Hung Yeh, Taipei (TW)

(72) Inventors: Yu-Wen Cheng, Taipei (TW); Wei-Ning Chai, Taipei (TW); Ting-Wei Liu, Taipei (TW); Tzu-Yung Huang, Taipei (TW); Wang-Hung Yeh, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 17/841,680

(22) Filed: Jun. 16, 2022

(65) Prior Publication Data

US 2022/0413563 A1    Dec. 29, 2022

Related U.S. Application Data

(60) Provisional application No. 63/279,693, filed on Nov. 16, 2021, provisional application No. 63/214,786, filed on Jun. 25, 2021.

(51) Int. Cl.
*G06F 1/16*    (2006.01)

(52) U.S. Cl.
CPC .......... *G06F 1/1681* (2013.01); *G06F 1/1641* (2013.01)

(58) Field of Classification Search
CPC .... G06F 1/1681; G06F 1/1641; G06F 1/1669; G06F 2200/1614; G06F 1/1616
See application file for complete search history.

(56) References Cited

U.S. PATENT DOCUMENTS

| | | | |
|---|---|---|---|
| 6,794,798 B2* | 9/2004 | Watanabe | H04R 5/02 310/334 |
| 7,782,274 B2* | 8/2010 | Manning | G06F 1/1641 345/1.3 |
| 8,243,471 B2* | 8/2012 | Liang | G06F 1/1607 361/810 |
| 9,049,911 B1* | 6/2015 | Wood | A45C 11/00 |

(Continued)

FOREIGN PATENT DOCUMENTS

| CN | 202600564 | 12/2012 |
|---|---|---|
| CN | 205899436 | 1/2017 |

(Continued)

OTHER PUBLICATIONS

"Office Action of Taiwan Counterpart Application", dated Dec. 12, 2022, p. 1-p. 9.

*Primary Examiner* — Rockshana D Chowdhury
(74) *Attorney, Agent, or Firm* — JCIPRNET

(57) ABSTRACT

A portable electronic device, including a first body and a second body, is provided. The second body includes a support structure and a display panel. The support structure is pivotally connected to the first body and is connected to the display panel. The support structure has a first bendable portion. An included angle between the first bendable portion and an edge of the support structure is 45 degrees. The support structure is adapted to be bent along the first bendable portion, so that the second body switches between a first mode and a second mode relative to the first body.

30 Claims, 18 Drawing Sheets

(56) References Cited

U.S. PATENT DOCUMENTS

| | | | | |
|---|---|---|---|---|
| 9,119,308 B2* | 8/2015 | Juan | .................... | G06F 1/1632 |
| 9,195,268 B2* | 11/2015 | Chen | .................... | G06F 1/1632 |
| 9,215,916 B2* | 12/2015 | Kim | .................... | A45C 11/00 |
| 9,320,164 B1* | 4/2016 | Diebel | ................. | G06F 1/1628 |
| 9,451,822 B2* | 9/2016 | Gu | ...................... | F16M 11/041 |
| 10,159,319 B2* | 12/2018 | Sirichai | ............... | H05K 5/0234 |
| 10,231,043 B2* | 3/2019 | Hemesath | .......... | A45C 13/1069 |
| 10,497,339 B2* | 12/2019 | Sato | ...................... | G09G 5/003 |
| 10,761,572 B1* | 9/2020 | Siddiqui | ............... | G06F 1/1681 |
| 10,990,125 B1* | 4/2021 | Tsai | ...................... | G06F 1/1681 |
| 10,996,913 B2* | 5/2021 | Ku | ........................ | G06F 1/1681 |
| 11,054,864 B1* | 7/2021 | Watamura | ............. | G06F 1/1626 |
| 11,086,364 B2* | 8/2021 | Yamazaki | ............... | H04M 1/02 |
| 11,116,086 B2* | 9/2021 | Kim | ..................... | G06F 1/1652 |
| 11,243,576 B2* | 2/2022 | Gerardi | ................. | G06F 1/1632 |
| 11,500,426 B2* | 11/2022 | Godfrey | ................. | G06F 1/203 |
| 11,567,542 B2* | 1/2023 | Miller | .................. | G06F 1/1669 |
| 11,582,876 B2* | 2/2023 | Ko | .......................... | G09F 9/301 |
| 11,599,156 B2* | 3/2023 | Kim | ..................... | G06F 1/1641 |
| 2013/0194760 A1* | 8/2013 | Lee | ....................... | G06F 1/1616 |
| | | | | 361/679.01 |
| 2015/0055286 A1* | 2/2015 | Eguchi | ............... | H10K 59/1213 |
| | | | | 361/679.26 |
| 2016/0338459 A1* | 11/2016 | Yow | ...................... | A45C 11/00 |
| 2020/0019368 A1* | 1/2020 | Ku | ........................ | G06F 1/1654 |
| 2021/0048847 A1* | 2/2021 | Fenton | ................. | G06F 1/1628 |

FOREIGN PATENT DOCUMENTS

| | | |
|---|---|---|
| CN | 104063012 | 8/2018 |
| TW | M429298 | 5/2012 |
| TW | I701547 | 8/2020 |

* cited by examiner

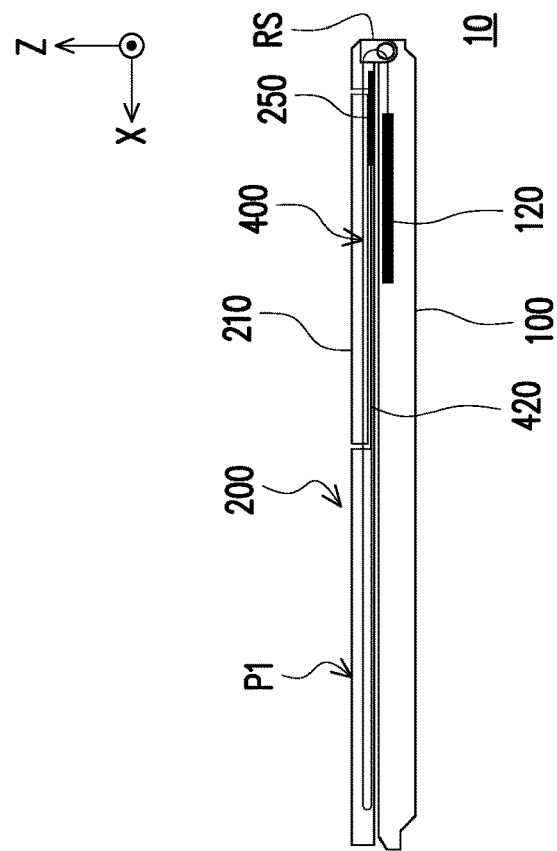
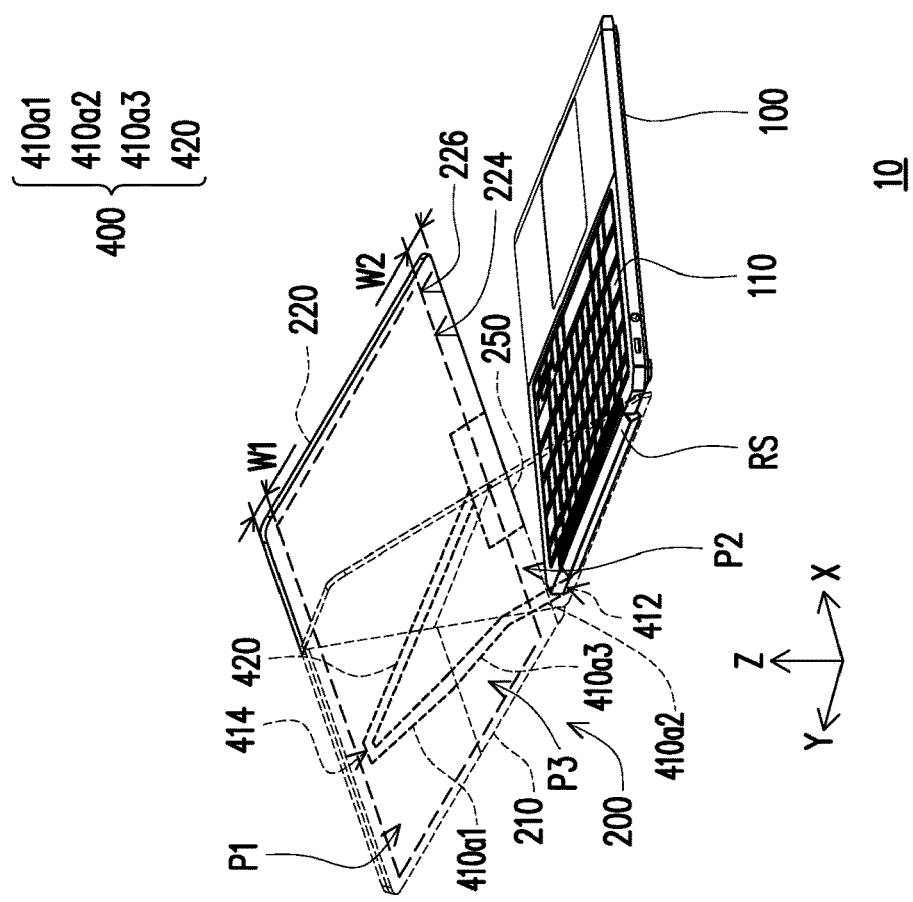
FIG. 9B
FIG. 9A

PORTABLE ELECTRONIC DEVICE

CROSS-REFERENCE TO RELATED APPLICATION

This application claims the priority benefit of U.S. Provisional Application No. 63/214,786, filed on Jun. 25, 2021 and U.S. Provisional Application No. 63/279,693, filed on Nov. 16, 2021. The entirety of each of the above-mentioned patent applications is hereby incorporated by reference herein and made a part of this specification.

BACKGROUND

Technical Field

The disclosure relates to an electronic device, and particularly to a portable electronic device.

Description of Related Art

Current portable electronic devices usually focus on the usage scenario of a single user. For example, the display panel of a portable electronic device is oriented toward a single direction, which not only limits the usage manner of the user, but is also not conducive to the viewing experience of multiple users. Therefore, how to improve the mobility of the display panel of the portable electronic device and expand the usage scenario of the portable electronic device is an urgent issue to be solved in the art.

SUMMARY

The disclosure provides a portable electronic device, which switches between various modes to improve the mobility of a display panel and expand the usage scenario of the portable electronic device.

The portable electronic device of the disclosure includes a first body and a second body. The second body includes a support structure and a display panel. The support structure is pivotally connected to the first body and is connected to the display panel. The support structure has a first bendable portion. An included angle between the first bendable portion and an edge of the support structure is 45 degrees. The support structure is adapted to be bent along the first bendable portion, so that the second body switches between a first mode and a second mode relative to the first body.

In an embodiment of the disclosure, when the second body is closed onto the first body, the display panel is located between the first body and the support structure.

In an embodiment of the disclosure, the first bendable portion divides the support structure into a first block and a second block.

In an embodiment of the disclosure, the support structure has a second bendable portion parallel to the edge of the support structure.

In an embodiment of the disclosure, when the second body is closed onto the first body, the support structure is located between the first body and the display panel.

In an embodiment of the disclosure, a distance between the second bendable portion and the edge is equal to a distance between the second bendable portion and another edge.

In an embodiment of the disclosure, the first bendable portion and the second bendable portion are staggered with each other to divide the support structure into a first block, a second block, a third block, and a fourth block.

In an embodiment of the disclosure, the first block is connected to the display panel. The second block is pivotally connected to the first body.

In an embodiment of the disclosure, the first block and the third block are respectively located on two opposite sides of the second bendable portion, and the first block and the fourth block are respectively located on two opposite sides of the first bendable portion.

In an embodiment of the disclosure, an area of the second block is greater than an area of the fourth block, the area of the fourth block is greater than an area of the first block, and the area of the first block is greater than an area of the third block.

In an embodiment of the disclosure, the support structure includes a soft layer connecting the first block, the second block, the third block, and the fourth block.

In an embodiment of the disclosure, the soft layer is disposed in the first block, the second block, the third block, and the fourth block.

In an embodiment of the disclosure, a gap between the first block, the second block, the third block, and the fourth block exposes at least part of the soft layer.

In an embodiment of the disclosure, at least part of the soft layer forms the first bendable portion and the second bendable portion.

In an embodiment of the disclosure, the first block is located between the display panel and at least part of the soft layer.

In an embodiment of the disclosure, at least part of the soft layer is located between the display panel and the first block.

In an embodiment of the disclosure, when the second body is in the first mode, the first block and the second block do not overlap with each other. When the second body is in the second mode, the first block overlaps with the second block and the fourth block, and the third block overlaps with the second block.

In an embodiment of the disclosure, the support structure is adapted to be bent along the second bendable portion, so that the second body switches between the first mode and a third mode relative to the first body.

In an embodiment of the disclosure, when the second body is in the first mode, the first block, the second block, the third block, and the fourth block do not overlap with each other. When the second body is in the third mode, the first block overlaps with the second block and the third block, and the fourth block overlaps with the second block.

In an embodiment of the disclosure, the second body includes multiple magnetic members, and the magnetic members are respectively disposed on the support structure and the display panel. The second body is maintained in the first mode, the second mode, or the third mode by magnetic attraction between at least two of the magnetic members.

In an embodiment of the disclosure, the second body includes multiple sensors disposed on the support structure or the display panel. The sensors are adapted to sense whether the second body is in the first mode, the second mode, or the third mode.

In an embodiment of the disclosure, the portable electronic device further includes an expansion module disposed in the second block or the fourth block.

In an embodiment of the disclosure, when the second body is in the first mode or the third mode, the expansion module is closed. When the second body is in the second mode, the expansion module does not overlap with the display panel. When the second body is in the second mode, the expansion module is opened.

In an embodiment of the disclosure, the expansion module is a contact function module or a hotkeys module. The contact function module is a wireless charging module or a data transmission module.

In an embodiment of the disclosure, the first body includes a main circuit board, and the display panel includes a control circuit board. The portable electronic device further includes a wiring, and the wiring connects the main circuit board and the control circuit board through the support structure.

In an embodiment of the disclosure, the wiring has a first segment disposed in the first block and connected to the control circuit board. The wiring has a second segment, and the second segment is disposed in the second block to connect to the main circuit board. The wiring has a third segment, and the third segment is disposed in the third block to connect the first segment and the second segment.

In an embodiment of the disclosure, the wiring has an extended segment disposed in the display panel and connected to the control circuit board. The wiring has a first segment, and the first segment is disposed in the first block and is connected to the extended segment.

In an embodiment of the disclosure, the first bendable portion includes a third rotating shaft fixed to the third block. The second bendable portion includes a fourth rotating shaft fixed to the fourth block.

In an embodiment of the disclosure, the first bendable portion includes a first rotating shaft fixed to the first block.

In an embodiment of the disclosure, the second bendable portion includes a second rotating shaft fixed to the first block.

In an embodiment of the disclosure, the portable electronic device further includes an angle tube fixed to the second block. A section of the angle tube corresponds to the first bendable portion, and another section of the angle tube corresponds to the second bendable portion.

In an embodiment of the disclosure, the portable electronic device further includes a first decorative tube disposed between the first block and the fourth block, and a second decorative tube disposed between the first block and the third block.

Based on the above, in the portable electronic device of the disclosure, the second body switches between the first mode and the second mode through the first bendable portion to achieve the effects of flipping the display panel and expanding the usage scenario of the portable electronic device. In addition, there is no need to dispose a 360-degree rotating shaft in order to switch the usage mode, and there is no need to lift the entire device when switching the usage mode, so that the mode switching of the portable electronic device can be more convenient and quicker, and the manufacturing cost can be reduced.

In order for the features and advantages of the disclosure to be more comprehensible, the following specific embodiments are described in detail in conjunction with the drawings.

BRIEF DESCRIPTION OF THE DRAWINGS

FIG. 9A and FIG. 9B are schematic views of wiring of the portable electronic device of FIG. 1B at different viewing angles.

DETAILED DESCRIPTION OF DISCLOSED EMBODIMENTS

Figure 1A:
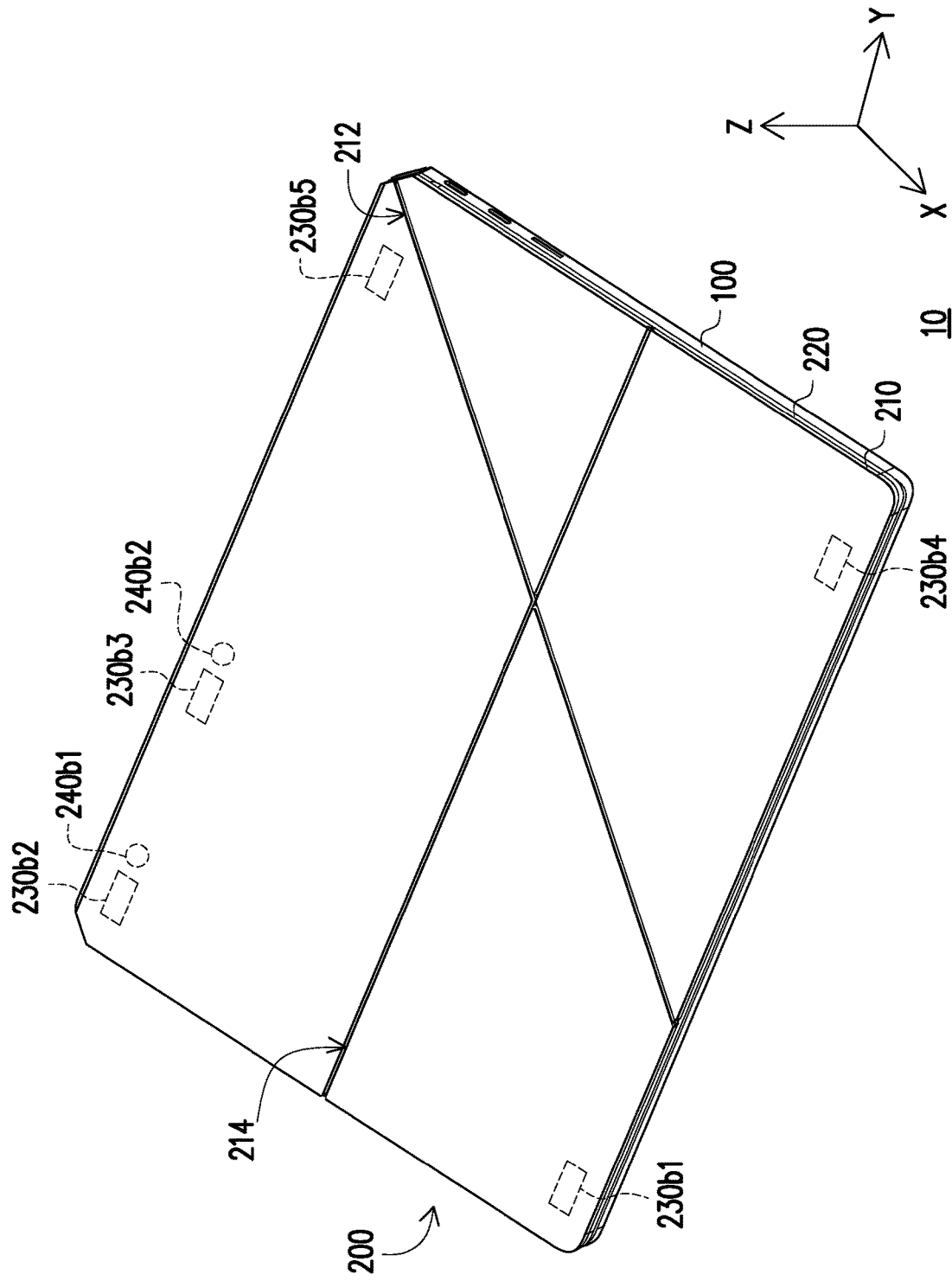
FIG. 1A is a schematic view of a portable electronic device in a close state according to an embodiment of the disclosure.
Figure 1B:
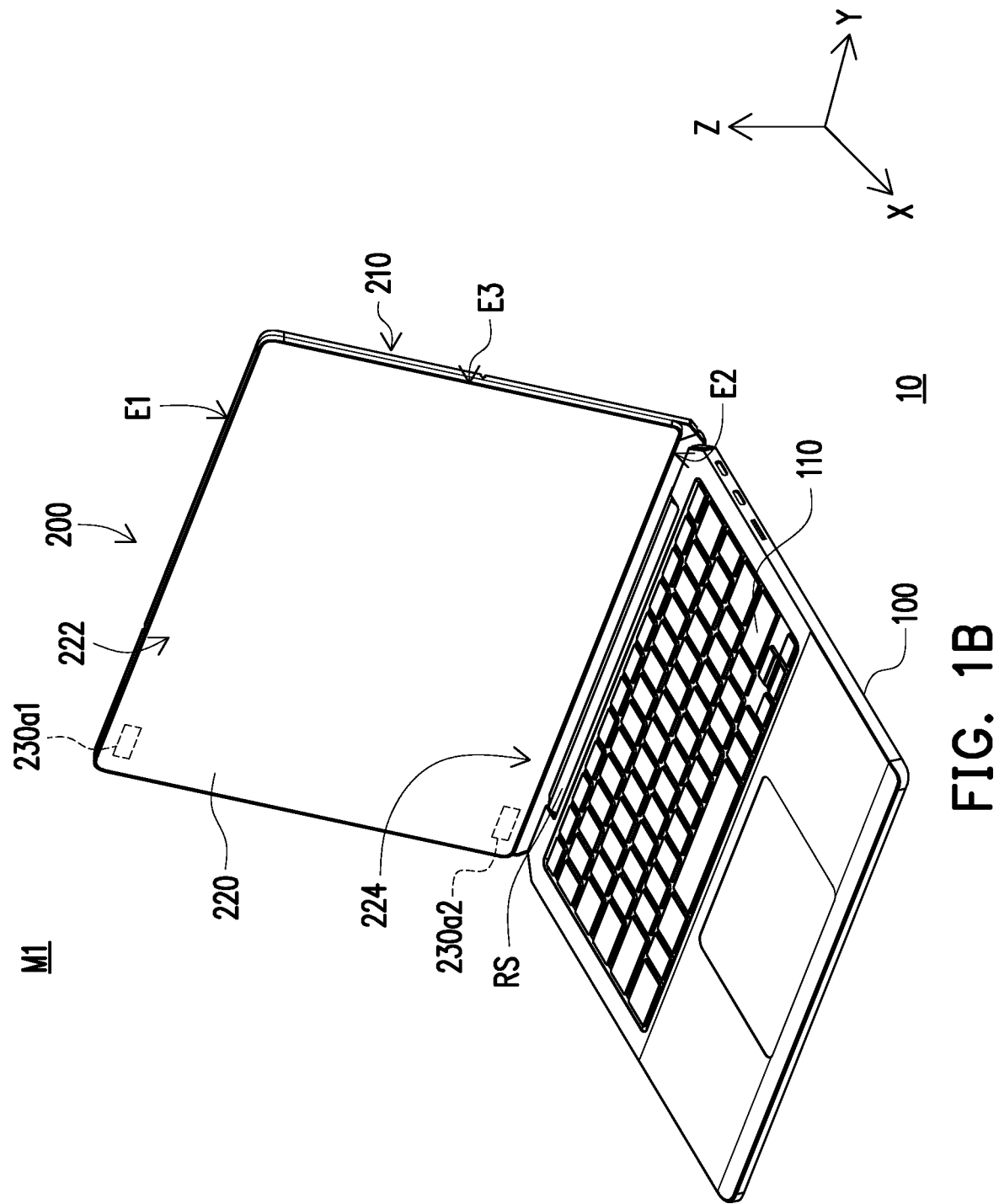
FIG. 1B is a schematic view of the portable electronic device of FIG. 1A in an open state.
Figure 1C:
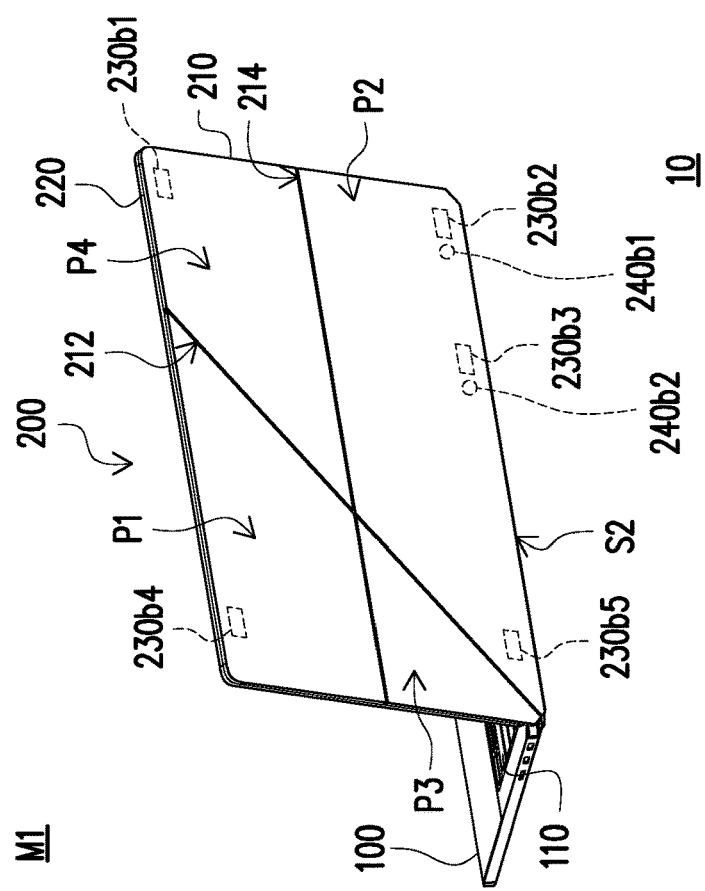
FIG. 1C is another viewing angle of the portable electronic device of FIG. 1B.

FIG. 1A is a schematic view of a portable electronic device in a close state according to an embodiment of the disclosure. FIG. 1B is a schematic view of the portable electronic device of FIG. 1A in an open state. FIG. 1C is another viewing angle of the portable electronic device of FIG. 1B. Please refer to FIG. 1A to FIG. 1C at the same time. A portable electronic device 10 of the embodiment includes a first body 100 and a second body 200. The second body 200 includes a support structure 210 and a display panel 220. When the second body 200 is closed onto the first body 100 as shown in FIG. 1A, the display panel 220 is located between the first body 100 and the support structure 210. A rotating shaft RS is disposed between the first body 100 and the second body 200, and more specifically, the rotating shaft RS is disposed between the first body 100 and the support structure 210, so that the support structure 210 is pivotally connected to the first body 100 by the rotating shaft RS, and the display panel 220 is connected to the support structure. The second body 200 of the portable electronic device 10 of FIG. 1A may be pivotally rotated to the open state as shown in FIG. 1B relative to the first body 100 through the rotating shaft RS.

As shown in FIG. 1C, the support structure 210 has a first bendable portion 212 and a second bendable portion 214. The support structure 210 is adapted to be bent along the first bendable portion 212 or the second bendable portion 214. Here, the first bendable portion 212 and the second bendable portion 214 may be regarded as folding lines of the support structure 210. When the user bends the support structure 210, the display panel 220 changes a display direction (for example, forward or backward) and a display manner (for example, a horizontal display or a vertical display) along with the bending of the support structure 210. Specifically, the support structure 210 may be bent along the first bendable portion 212, so that the second body 200 switches between a first mode M1 (shown in FIG. 1B) and a second mode M2 (shown in FIG. 2D) relative to the first body 100. The support structure 210 may also be bent along the second bendable portion 214, so that the second body 200 switches between the first mode M1 and a third mode M3 (shown in FIG. 3D) relative to the first body 100.

In the embodiment, the first bendable portion 212 and the second bendable portion 214 are staggered with each other to divide the support structure 210 into a first block P1, a second block P2, a third block P3, and a fourth block P4. The first block P1 and the third block P3 are respectively located on two opposite sides of the second bendable portion 214, and the first block P1 and the fourth block P4 (and the second block P2) are respectively located on two opposite sides of the first bendable portion 212. The display panel 220 is connected to the first block P1 of the support structure 210 and is movably connected to the second block P2 and the fourth block P4, so when the support structure 210 is bent, the display panel 220 moves along with the first block P1. The rotating shaft RS is disposed in the second block P2, so that the second body 200 is pivotally connected to the first body 100 through the second block P2.

The second body 200 of the embodiment includes multiple magnetic members 230a1, 230a2, and 230b1 to 230b5 respectively disposed on the support structure 210 and the display panel 220. Here, the magnetic members 230a1 and 230a2 are disposed on the display panel 220 (shown in FIG. 1B), the magnetic members 230b1 to 230b5 are disposed on the support structure 210 (shown in FIG. 1C), and the second body 200 is maintained in the first mode M1 (shown in FIG. 1B), the second mode M2 (shown in FIG. 2D), or the third mode M3 (shown in FIG. 3D) by magnetic attraction between at least two magnetic members, as described in detail below.

As shown in FIG. 1B and FIG. 1C, the display panel 220 has an upper end 222 and a lower end 224 opposite to each other. The upper end 222 and the lower end 224 are respectively provided with magnetic members 230a1 and 230a2. Corresponding magnetic members 230b1 and 230b2 are provided in the second block P2 and the fourth block P4 of the support structure 210. The second body 200 is stably maintained in the first mode M1 by the magnetic attraction between the magnetic members 230a1 and 230a2 and the magnetic members 230b1 and 230b2. As shown in FIG. 1B, the magnetic member 230a1 overlaps with the magnetic member 230b1 and the magnetic member 230a2 overlaps with the magnetic member 230b2. In the first mode M1, the display direction of the display panel 220 is toward a +X direction (forward) and the display manner is horizontal. At this time, a lower edge E2 of the display panel 220 is adjacent to the first body 100.

Figure 2A:
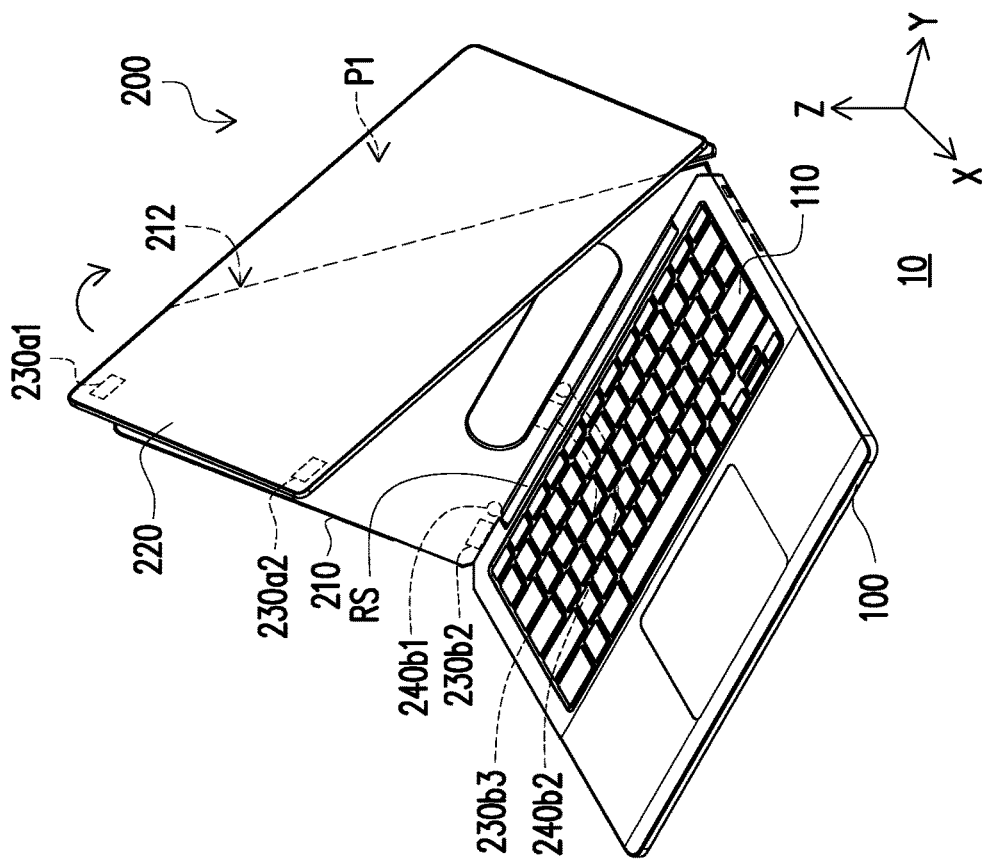
FIG. 2A and FIG. 2B are different viewing angles during a process of switching a second body of FIG. 1B to a second mode.
Figure 2C:
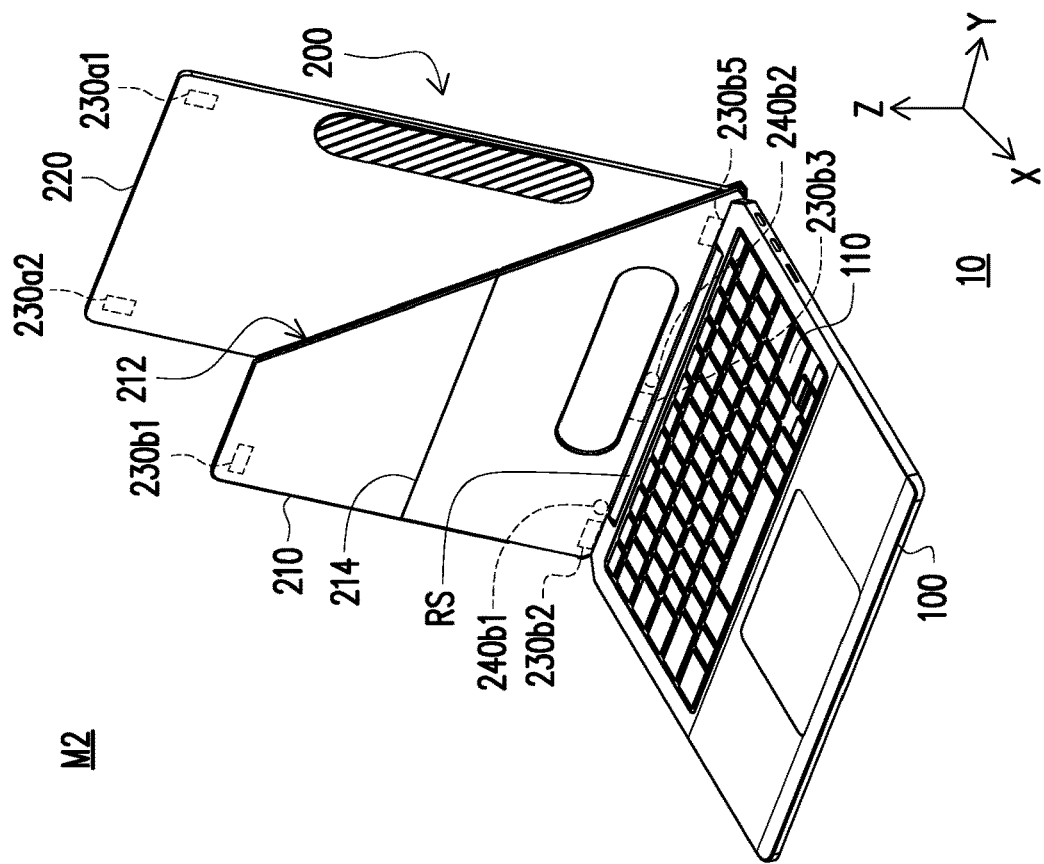
FIG. 2C and FIG. 2D are schematic views of different viewing angles of the second body of FIG. 1B in the second mode.
Figure 2B:
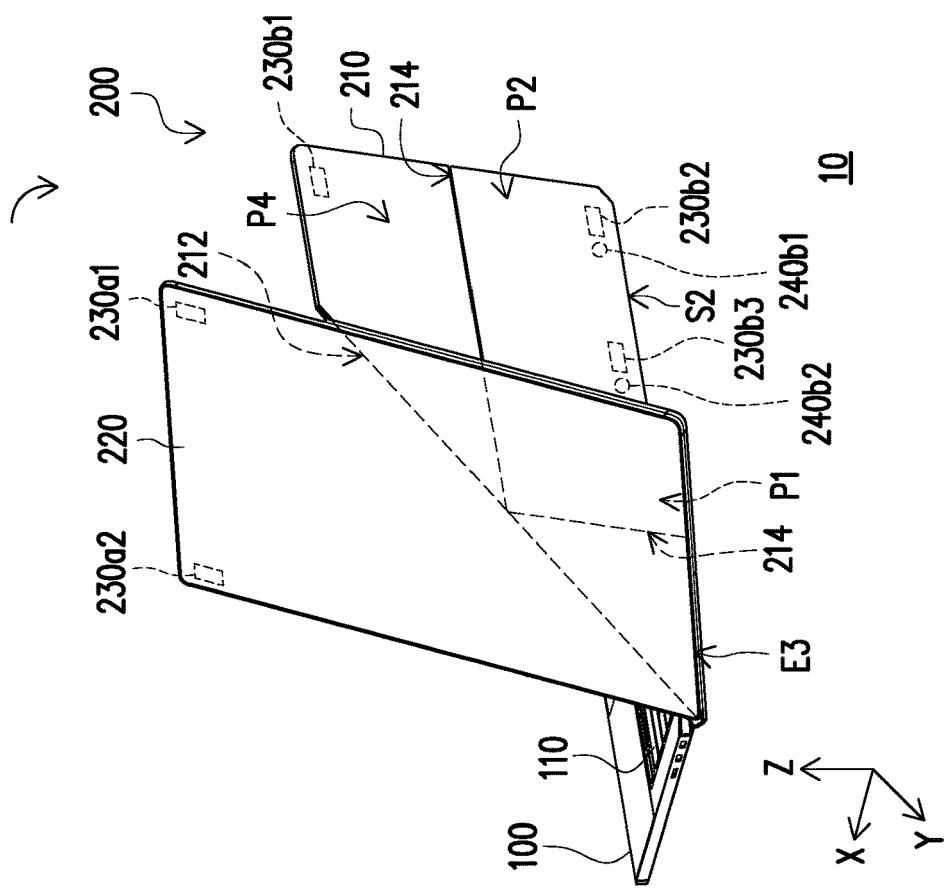
Figure 2D:
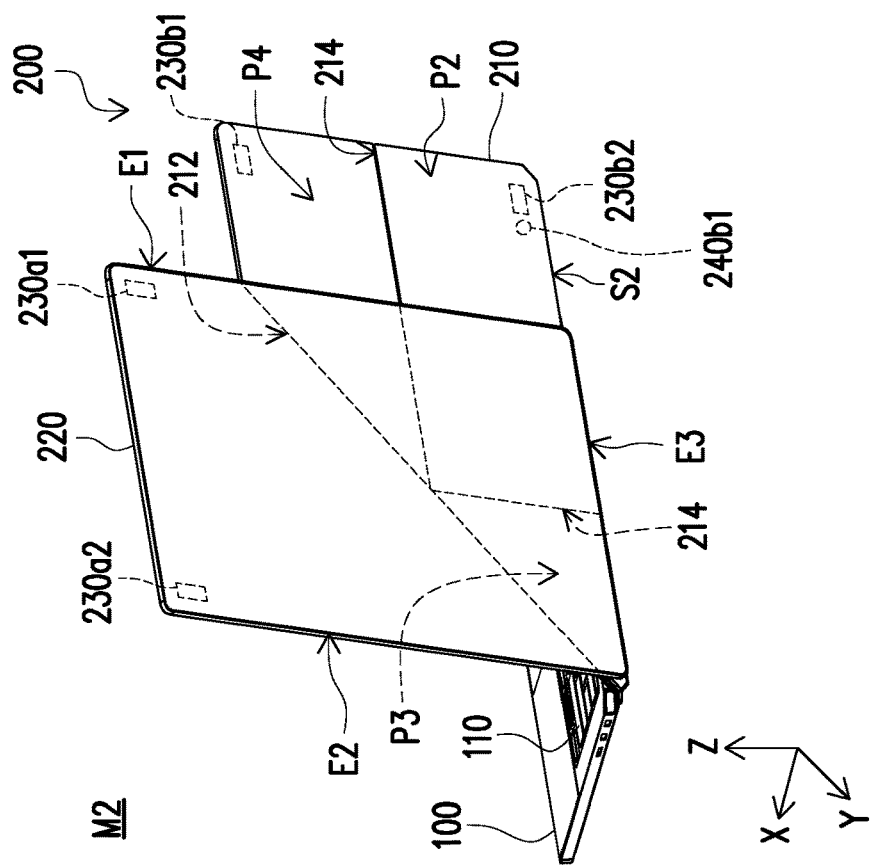

FIG. 2A and FIG. 2B are different viewing angles during a process of switching a second body of FIG. 1B to a second mode. FIG. 2C and FIG. 2D are schematic views of different viewing angles of the second body of FIG. 1B in the second mode. Please refer to FIG. 2A to FIG. 2D at the same time. When switching the second body 200 from the first mode M1 (shown in FIG. 1B) to the second mode M2, a user may lift the display panel 220 along an arrow direction (shown in FIG. 2A), so that the support structure 210 is bent along the first bendable portion 212. FIG. 2B is another view of FIG. 2A. At this time, the display panel 220 is flipped along with the first block P1, and the second bendable portion 214 is partially bent. Finally, the display panel 220 is flipped to a position (the second mode M2) shown in FIG. 2C and FIG. 2D. Here, the display direction of the display panel 220 is toward a −X direction (backward) and the display manner is vertical. At this time, an edge E3 of the display panel 220 is adjacent to the first body 100.

In order for the second body 200 to be stably maintained in the second mode M2, magnetic members 230b3 and 230b4 (shown in FIG. 1C) are disposed in the first block P1 and the second block P2 of the support structure. In the second mode M2 (shown in FIG. 2D), the display panel 220 is fixed by the magnetic attraction of the magnetic members 230b3 and 230b4. In the second mode M2, the user may also lift the display panel 220 to move the display panel 220 from the position shown in FIG. 2D to a position shown in FIG. 2B, and further move the display panel 220 back to a position (the first mode M1) shown in FIG. 1B. In other words, the support structure 210 may be bent bidirectionally along the first bendable portion 212, so that the second body 200 switches between the first mode M1 and the second mode M2. After switching the usage mode of the second body 200, the user may adjust the opening and closing angles of the second body 200 and the first body 100 through the rotating shaft RS.

Figure 3A:
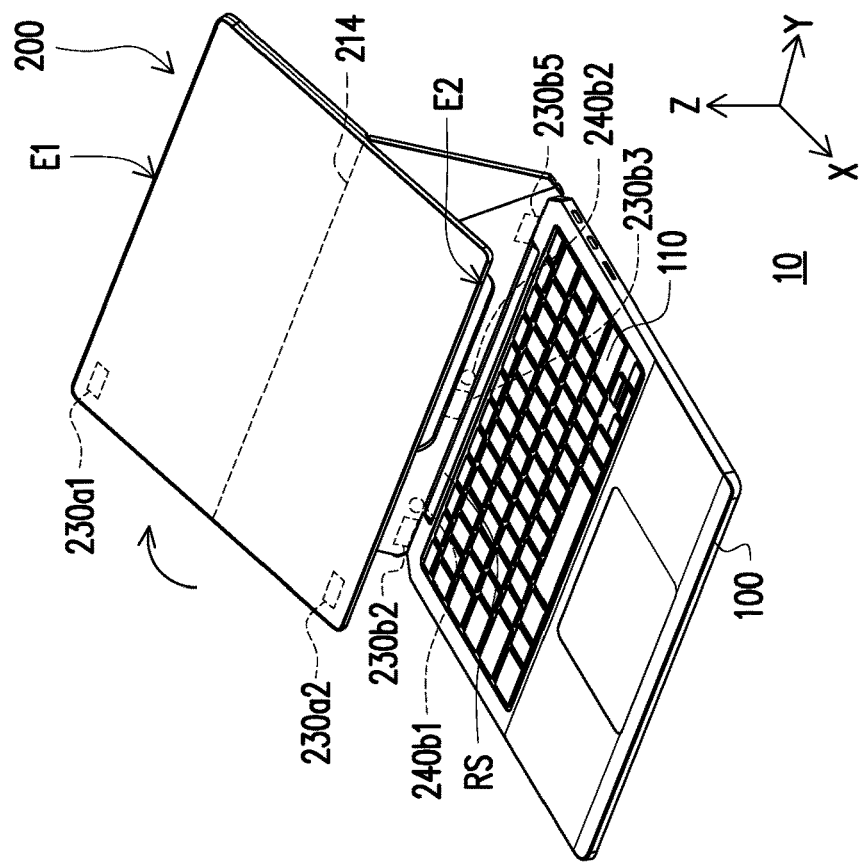
FIG. 3A and FIG. 3B are different viewing angles during a process of switching the second body of FIG. 1B to a third mode.
Figure 3C:
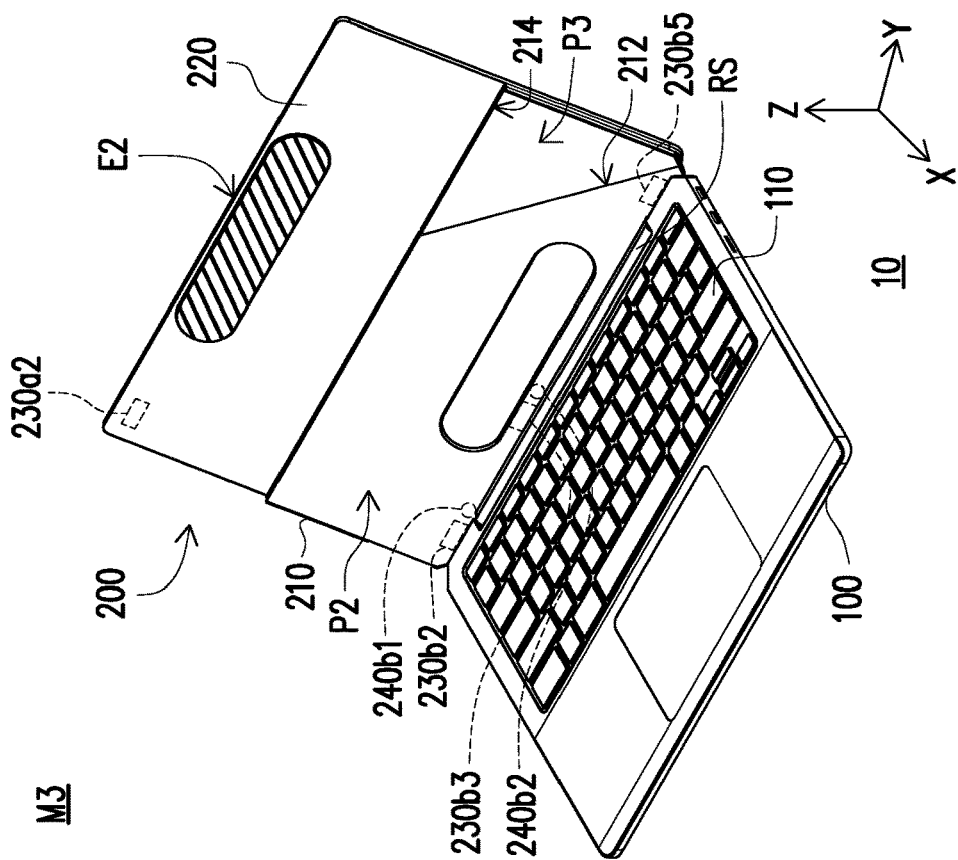
FIG. 3C and FIG. 3D are schematic views of different viewing angles of the second body of FIG. 1B in the third mode.
Figure 3B:
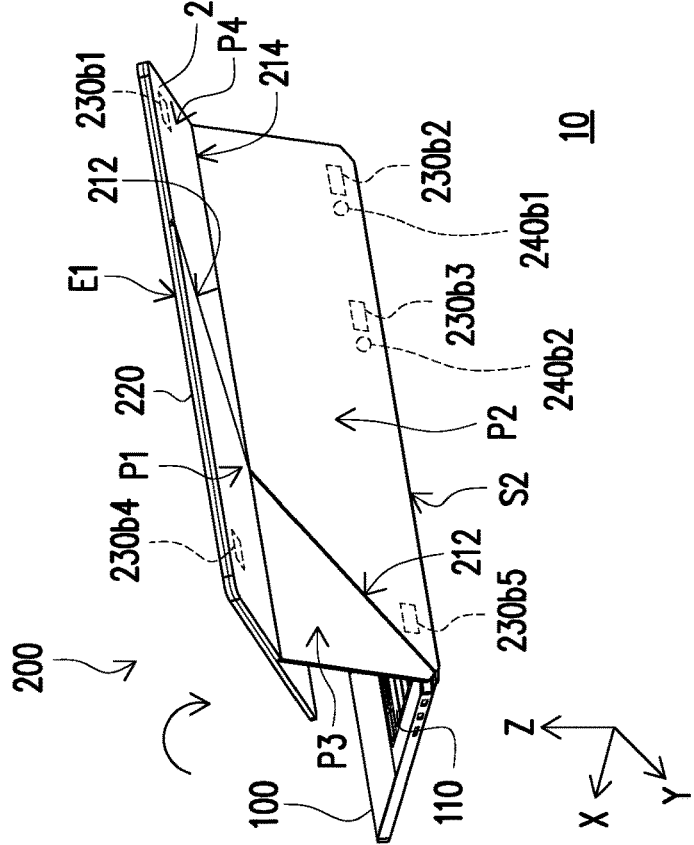

FIG. 3A and FIG. 3B are different viewing angles during a process of switching the second body of FIG. 1B to a third mode. FIG. 3C and FIG. 3D are schematic views of different viewing angles of the second body of FIG. 1B in the third mode. Please refer to FIG. 3A to FIG. 3D at the same time. When switching the second body 200 from the first mode M1 to the third mode M3 (shown in FIG. 3D), the user may lift the display panel 220 along an arrow direction (shown in FIG. 3A), so that the support structure 210 is bent along the second bendable portion 214. FIG. 3B is another view of FIG. 3A. At this time, the display panel 220 is flipped along with the first block P1, and the first bendable portion 212 is partially bent. Finally, the display panel 220 is flipped to a position (the third mode M3) shown in FIG. 3C and FIG. 3D. Here, the display direction of the display panel 220 is toward the −X direction (backward) and the display manner is horizontal. An upper edge E1 of the display panel 220 is adjacent to the first body 100.

In order for the second body 200 to be stably maintained in the third mode M3, the fourth block P4 of the support structure 210 is further provided with the magnetic member 230b5 (shown in FIG. 1C). In the third mode M3, the magnetic member 230b1 attracts the magnetic member 230b2 and the magnetic member 230b4 attracts the magnetic member 230b5 to fix the display panel 220. In addition, the user may also lift the display panel 220 to move the display panel 220 from the position shown in FIG. 3D to a position shown in FIG. 3B, and further move the display panel 220 back to the position (the first mode M1) shown in FIG. 1B. In other words, the support structure 210 may be bent bidirectionally along the second bendable portion 214, so that the second body 200 switches between the first mode M1 (shown in FIG. 1B) and the third mode M3. After switching the usage mode of the second body 200, the user may adjust the opening and closing angles of the second body 200 and the first body 100 through the rotating shaft RS.

Figure 3E:
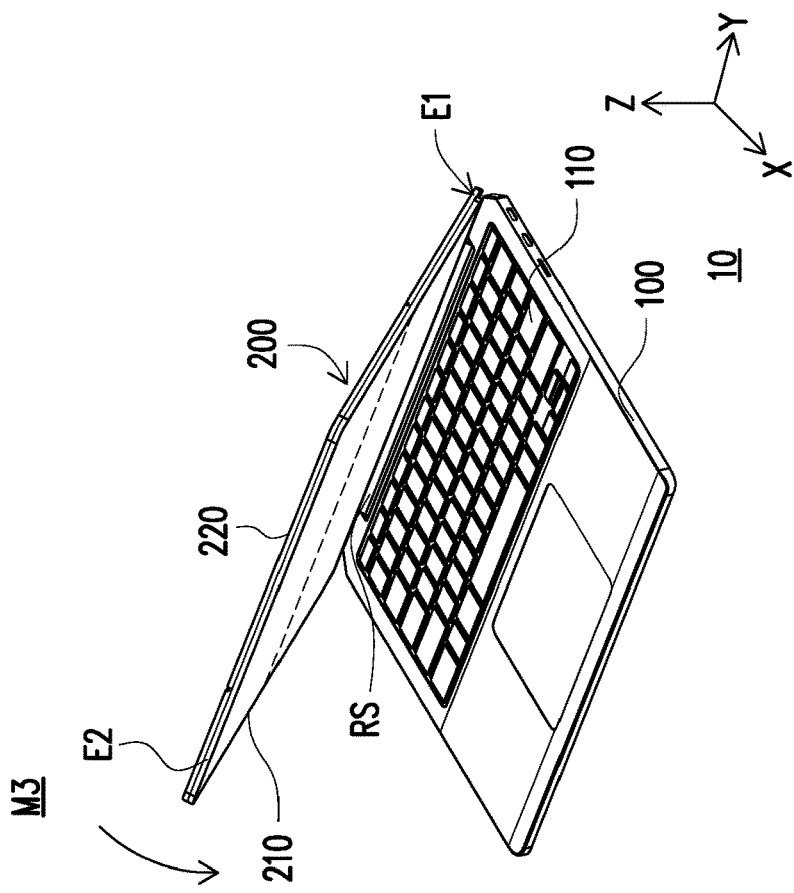
FIG. 3E and FIG. 3F are a process of switching the portable electronic device of FIG. 3D to another state.
Figure 3D:
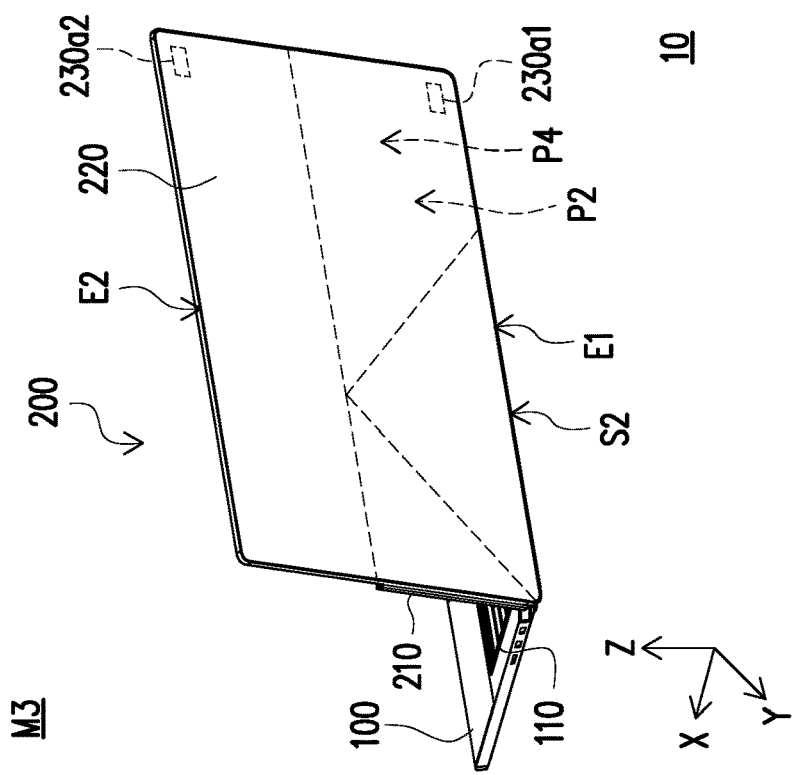
Figure 3F:
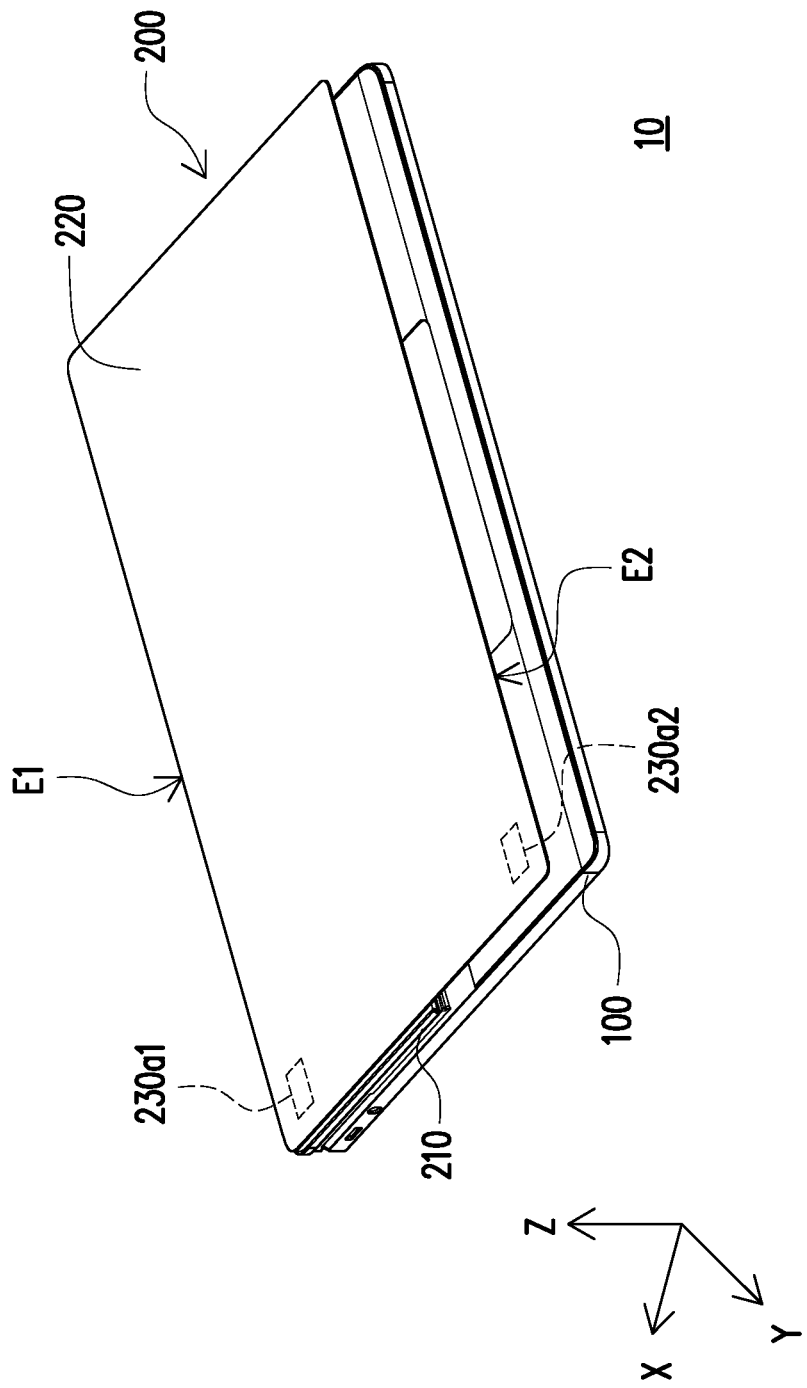

FIG. 3E and FIG. 3F are a process of switching the portable electronic device of FIG. 3D to another state. Please refer to FIG. 3E and FIG. 3F at the same time. The display panel 220 of the embodiment has a touch function. After switching the second body 200 to the third mode M3 (shown in FIG. 3D), the second body 200 is pivotally rotated toward the first body 100 through the rotating shaft RS, so that the second body 200 is closed onto the first body 100. At this time, the support structure 210 is located between the display panel 220 and the first body 100. In this way, the portable electronic device 10 of the embodiment may be used as a tablet to further expand the usage scenario of the portable electronic device 10.

It can be seen from the above that when switching the second body 200 between the first mode M1, the second mode M2, and the third mode M3, the display direction of the display panel 220 is actually flipped 360 degrees (forward or backward). Thereby, the portable electronic device 10 of the embodiment has various display manners, and the user may select a suitable manner according to requirements.

It is worth mentioning that the conventional portable electronic device that can be flipped 360 degrees needs to dispose a 360-degree rotating shaft between two bodies in order for the display panel to be flipped 360 degrees, and the entire portable electronic device needs to be lifted during the flipping period. In the embodiment, when switching the second body 200 between the first mode M1, the second mode M2, and the third mode M3, the mode conversion can be quickly completed without lifting the entire portable electronic device 10, and without using the 360-degree rotating shaft. Therefore, compared with the conventional portable electronic device, the portable electronic device 10 of the embodiment can switch between different display manners more quickly and does not need an additional element to reduce the manufacturing cost.

The display panel 220 of the embodiment also has a gravity sensor (G-sensor). The gravity sensor (not shown) is adapted to sense the usage mode of the second body 200 (that is, to sense whether the second body 200 is in the first mode M1, the second mode M2, or the third mode M3) and adjust the display manner (horizontal display or vertical display) of the display panel 220 accordingly. For example, when switching the second body 200 to the second mode M2 (shown in FIG. 2D), the gravity sensor senses the movement of the display panel 220 and switches the display panel 220 from horizontal display to vertical display.

Please refer back to FIG. 1C. The second body 200 of the embodiment has multiple sensors 240$b$1 and 240$b$2, and the sensors are disposed on at least one of the support structure 210 and the display panel 220. The sensors 240$b$1 and 240$b$2 are adapted to sense whether the second body 200 is the first mode M1 (shown in FIG. 1B), the second mode M2 (shown in FIG. 2D), or the third mode M3 (shown in FIG. 3D). The sensors 240$b$1 and 240$b$2 of the embodiment are, for example, magnetic sensors (such as Hall sensors), but not limited thereto. In other embodiments, the sensors 240$b$1 and 240$b$2 may be mechanical sensors. Please refer to FIG. 1C, FIG. 2D, and FIG. 3D. The sensors 240$b$1 and 240$b$2 of the embodiment are disposed on the support structure 210 and are respectively located beside the magnetic members 230$b$2 and 230$b$3. The sensors 240$b$1 and 240$b$2 are adapted to sense changes in the magnetic field generated by the magnetic attraction to the magnetic members 230$b$1 and 230$b$4 when the magnetic members 230$b$2 and 230$b$3 are in different usage modes, and judge the usage mode of the second body 200 accordingly.

For example, as shown in FIG. 1C, when the magnetic members 230$b$1 to 230$b$5 are not magnetically attracted to each other, the sensors 240$b$1 and 240$b$2 do not sense changes in the magnetic field. At this time, it is judged that the second body 200 is in the first mode M1 (shown in FIG. 1B). When the magnetic member 230$b$3 and the magnetic member 230$b$4 are magnetically attracted, the sensor 240$b$2 senses changes in the magnetic field and the sensor 240$b$1 does not sense changes in the magnetic field. At this time, it is judged that the second body 200 is in the second mode M2 (shown in FIG. 2D). When the magnetic member 230$b$1 and the magnetic member 230$b$2 are magnetically attracted, the sensor 240$b$1 senses changes in the magnetic field and the sensor 240$b$2 does not sense changes in the magnetic field. At this time, it is judged that the second body 200 is in the third mode M3 (shown in FIG. 3D).

Figure 4:
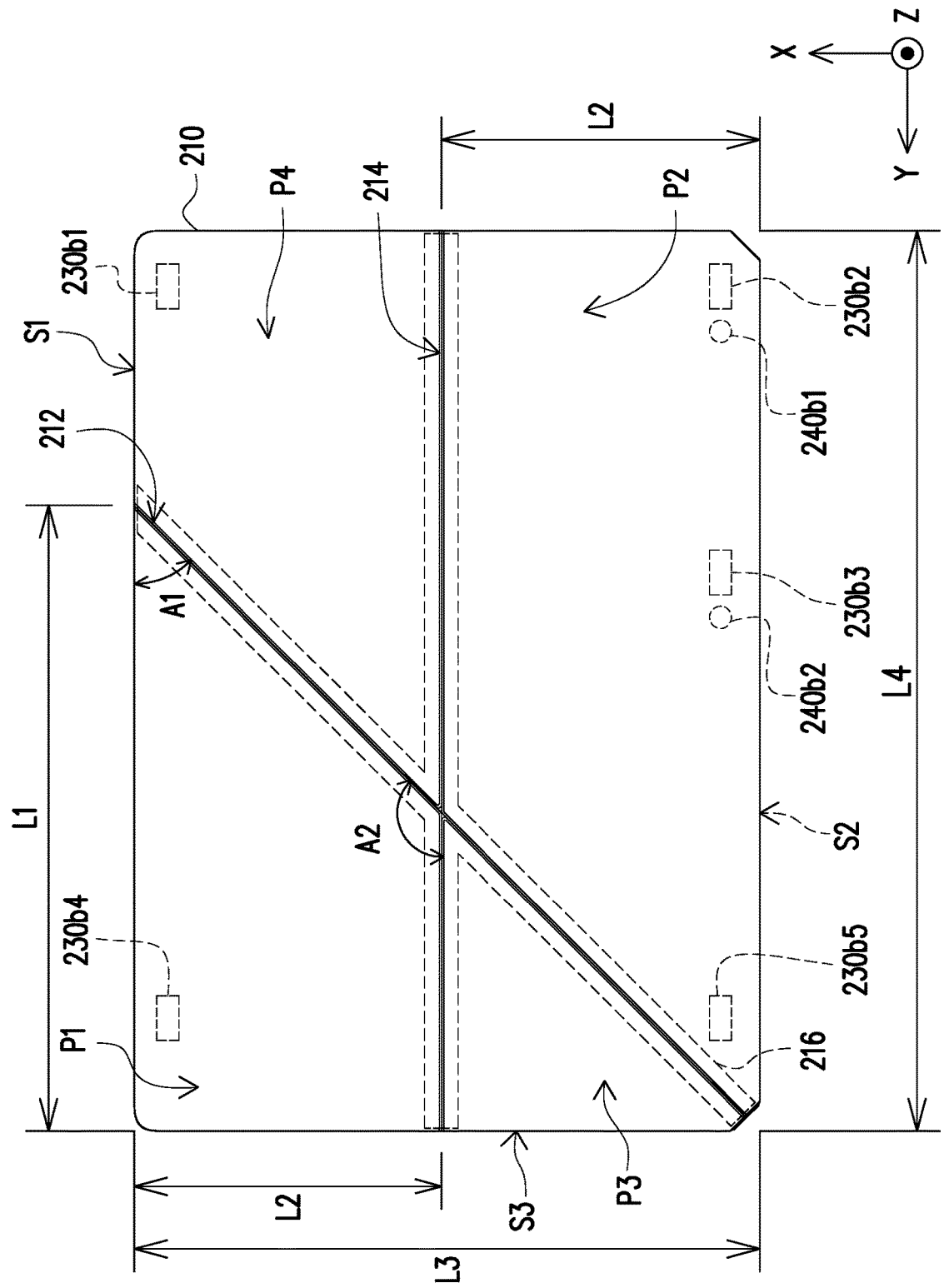
FIG. 4 is a top view of a support structure of FIG. 1C.

FIG. 4 is a top view of a support structure of FIG. 1C. Please refer to FIG. 2D, FIG. 3D, and FIG. 4 at the same time. An included angle A1 between the first bendable portion 212 of the support structure 210 and an edge S1 of the embodiment is 45 degrees, so when the support structure 210 is bent along the first bendable portion 212 such that the second body 200 switches to the second mode M2 (shown in FIG. 2D), the edge E3 of the display panel 220 approximately overlaps with the edge S2 of the support structure, so that the display panel 220 does not protrude from the edge S2. The second bendable portion 214 is parallel to the two opposite edges S1 and S2 of the support structure 210, and a distance between the second bendable portion 214 and the edge S1 is equal to a distance between the second bendable portion 214 and the other edge S2. Therefore, when the support structure 210 is bent along the second bendable portion 214 such that the second body 200 switches to the third mode M3 (shown in FIG. 3D), the upper edge E1 of the display panel 220 approximately overlaps with the edge S2 of the support structure 210, so that the display panel 220 does not protrude from the edge S2. Therefore, a length L1 of one side of the first block P1 of the embodiment is equal to a length L3 of the edge S3 of the support structure 210, and a length L2 of the other side is equal to half of the length L3 of the edge S3.

In addition, an included angle A2 between the first bendable portion 212 and the second bendable portion 214 of the embodiment is 135 degrees. The area of the second block P2 is greater than the area of the fourth block P4, the area of the fourth block P4 is greater than the area of the first block P1, and the area of the first block P1 is greater than the area of the third block P3. When the second body 200 is in the first mode M1, the first block P1, the second block P2, the third block P3, and the fourth block P4 do not overlap with each other. When the second body 200 is in the second mode M2, the first block P1 overlaps with the second block P2 and the third block P3, and the fourth block P4 overlaps with the second block P2. In the third mode M3, the fourth block P4 completely overlaps with the second block P2.

Figure 5A:
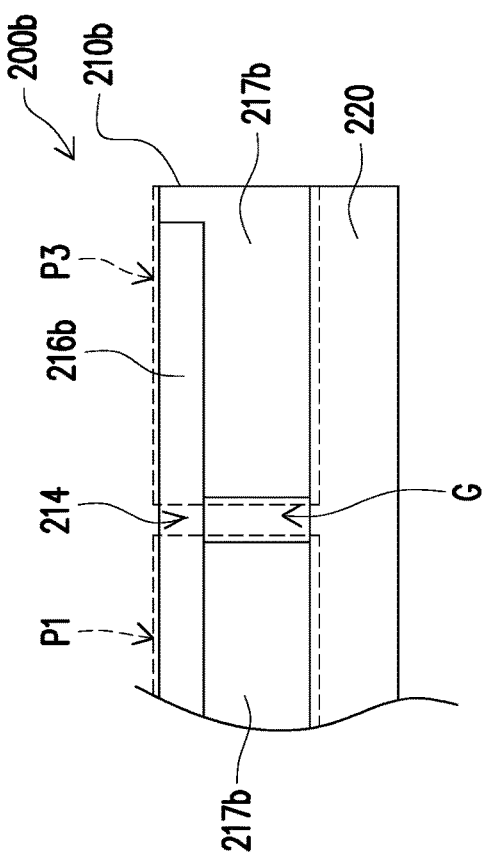
FIG. 5A is a partial cross-sectional schematic view of a second body of FIG. 4.

FIG. 5A is a partial cross-sectional schematic view of a second body of FIG. 4. Here, a soft layer 216 is represented by dotted lines. Please refer to FIG. 4 and FIG. 5A at the same time. The support structure 210 of the embodiment includes multiple plate bodies 217 and the soft layer 216. The soft layer 216 is a bendable soft material, and the plate bodies 217 are connected to the soft layer 216 with a gap G between the plate bodies 217. A part of the soft layer 216 corresponds to the gap G between the plate bodies 217 to form the first bendable portion 212 and the second bendable portion 214. When bending the support structure 210, the soft layer 216 is bent and drives the movement of the plate bodies 217. Here, the plate bodies 217 respectively correspond to the first block P1, the second block P2, the third block P3, and the fourth block P4. In other words, the first block P1, the second block P2, the third block P3, and the fourth block P4 are composed of the corresponding plate body 217 and the partial soft layer 216. As shown in FIG. 4, the soft layer 216 of the embodiment is a continuous structure and has an X shape rather than being fully laid on the support structure 210, but not limited thereto.

As shown in FIG. 5A, the at least part of the soft layer 216 here is located between the display panel 220 and the plate bodies 217, but not limited thereto. Here, the plate bodies 217 and the partial soft layer 216 form the first block P1 and the fourth block P4, and the partial soft layer 216 corresponding to the gap G forms the first bendable portion 212.

Figure 5B:
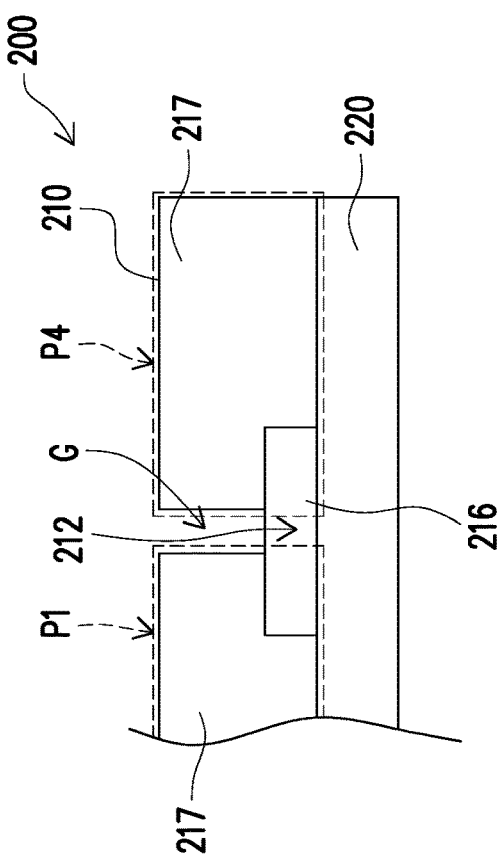
FIG. 5B is a partial cross-sectional schematic view of a second body according to another embodiment of the disclosure.

FIG. 5B is a partial cross-sectional schematic view of a second body according to another embodiment of the disclosure. Please refer to FIG. 5A and FIG. 5B at the same time. A support structure 210b of the embodiment is similar to the above-mentioned embodiment, and the difference between the two is that at least part of a plate body 217b of the embodiment is located between the display panel 220 and a soft layer 216b, and the soft layer 216b is fully laid on the plate body 217b. Here, the plate body 217b and the partial soft layer 216b form the first block P1 and the third block P3, and the partial soft layer 216b corresponding to the gap G forms the second bendable portion 214. The support structure 210b of the embodiment can achieve similar effects to the above-mentioned embodiment and may be set by the user according to requirements.

Figure 5C:
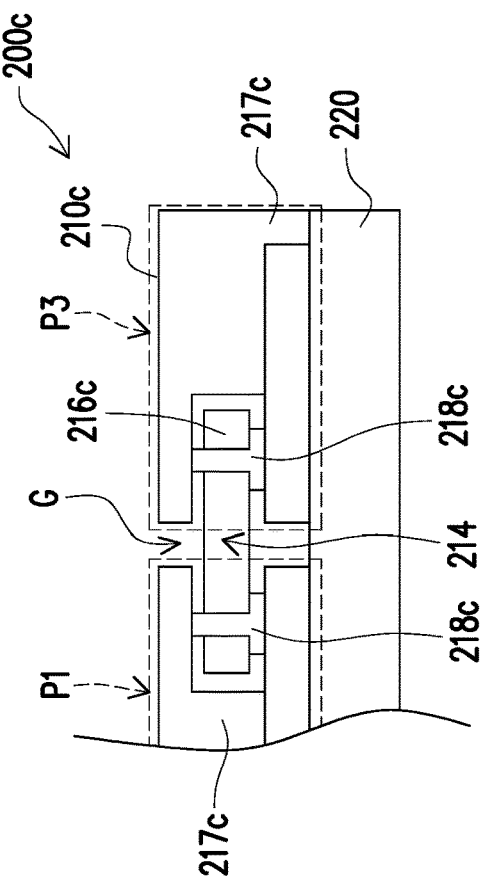
FIG. 5C is a partial cross-sectional schematic view of a second body according to another embodiment of the disclosure.

FIG. 5C is a partial cross-sectional schematic view of a second body according to another embodiment of the disclosure. Please refer to FIG. 5A and FIG. 5C at the same time. A support structure 210c of the embodiment is similar to the above-mentioned embodiment, and the difference between the two is that a soft layer 216c of the embodiment is disposed in a plate body 217c, and a support structure 210c includes multiple fasteners 218c to fix the soft layer 216c between the plate bodies 217c. Here, the plate body 217c and the partial soft layer 216c form the first block P1 and the third block P3, and the partial soft layer 216c corresponding to the gap G forms the second bendable portion 214. The support structure 210c of the embodiment can achieve similar effects to the above-mentioned embodiment and may be set by the user according to requirements.

Figure 6:
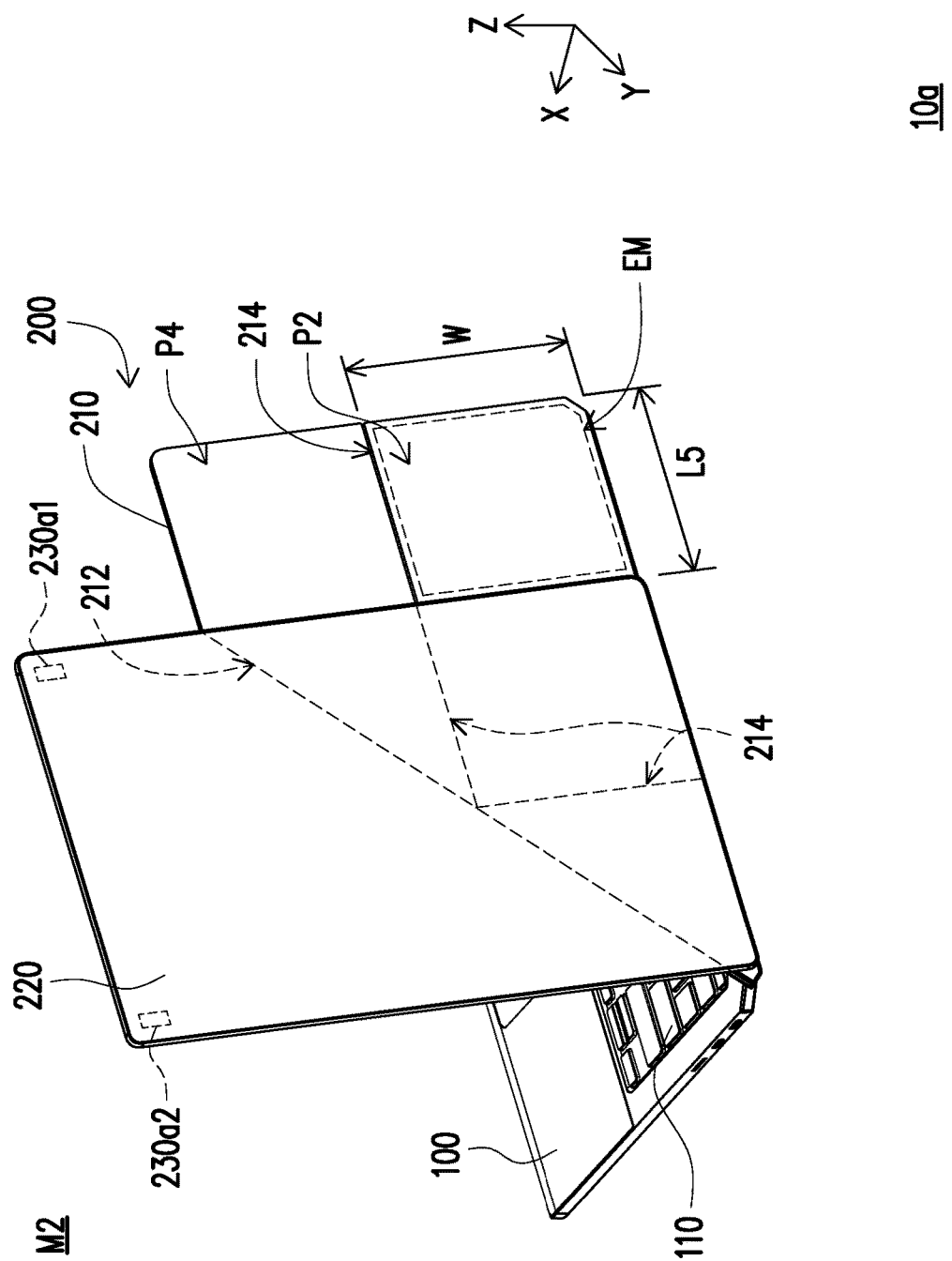
FIG. 6 is a schematic view of a portable electronic device according to another embodiment of the disclosure.

FIG. 6 is a schematic view of a portable electronic device according to another embodiment of the disclosure. The second body 200 of a portable electronic device 10a of FIG. 6 is in the second mode M2. Please refer to FIG. 6. The portable electronic device 10a of the embodiment includes an expansion module EM. The expansion module EM is disposed in the support structure 210. When the second body 200 is in the second mode M2, the expansion module EM is opened, and when the second body 200 is in the first mode M1 and the third mode M3, the expansion module EM is closed to prevent power from being wasted and prevent the user from accidentally touching the expansion module EM, which causes the portable electronic device 10a to be unable to be used normally. When the second body 200 is in the second mode M2, the expansion module EM is opened.

In the embodiment, the expansion module EM may be a contact function module, which is adapted to wireless charging and/or data transmission, but not limited thereto. The user may place an external electronic device (such as a mobile phone) on the expansion module EM to charge the electronic device or transmit data. In other embodiments not shown, the expansion module EM may be a hotkeys module. The hotkeys module includes general keyboard hotkeys, command prompt character keyboard hotkeys, and dialog box keyboard hotkeys, etc., and luminous or embossed hotkeys may be disposed to improve the usage convenience.

As shown in FIG. 6, in the second mode M2, a usable region of the expansion module EM is limited to the exposed region, that is, the region that does not overlap with the display panel 220. Therefore, in order to improve the usage efficiency and reduce the cost of the expansion module EM, when the second body 200 is the second mode M2, the expansion module EM does not overlap the display panel 220. As shown in FIG. 6, the expansion module EM of the embodiment is preferably disposed in the second block P2. The second block P2 is adjacent to the first body 100, and the space of the rotating shaft RS between the second block P2 and the first body 100 is relatively large, which is convenient for disposing the trace of the expansion module EM and shortening the length of the trace from the first body 100 to the expansion module EM, and the trace does not need to be disposed in the soft layer 216 to reduce the manufacturing cost, improve the yield, improve the durability, and/or improve the usage stability. In other words, a length L5 of one side of the expansion module EM of the embodiment is less than or equal to a length L4 minus the length L1 (as shown in FIG. 4), and a width W of the other side of the expansion module EM is less than or equal to the length L2 (as shown in FIG. 4). Of course, the configuration position and size of the expansion module EM are not limited thereto. For example, in other embodiments not shown, the expansion module EM may be disposed in the fourth block P4 or disposed in the second block P2 and the fourth block P4.

Figure 7:
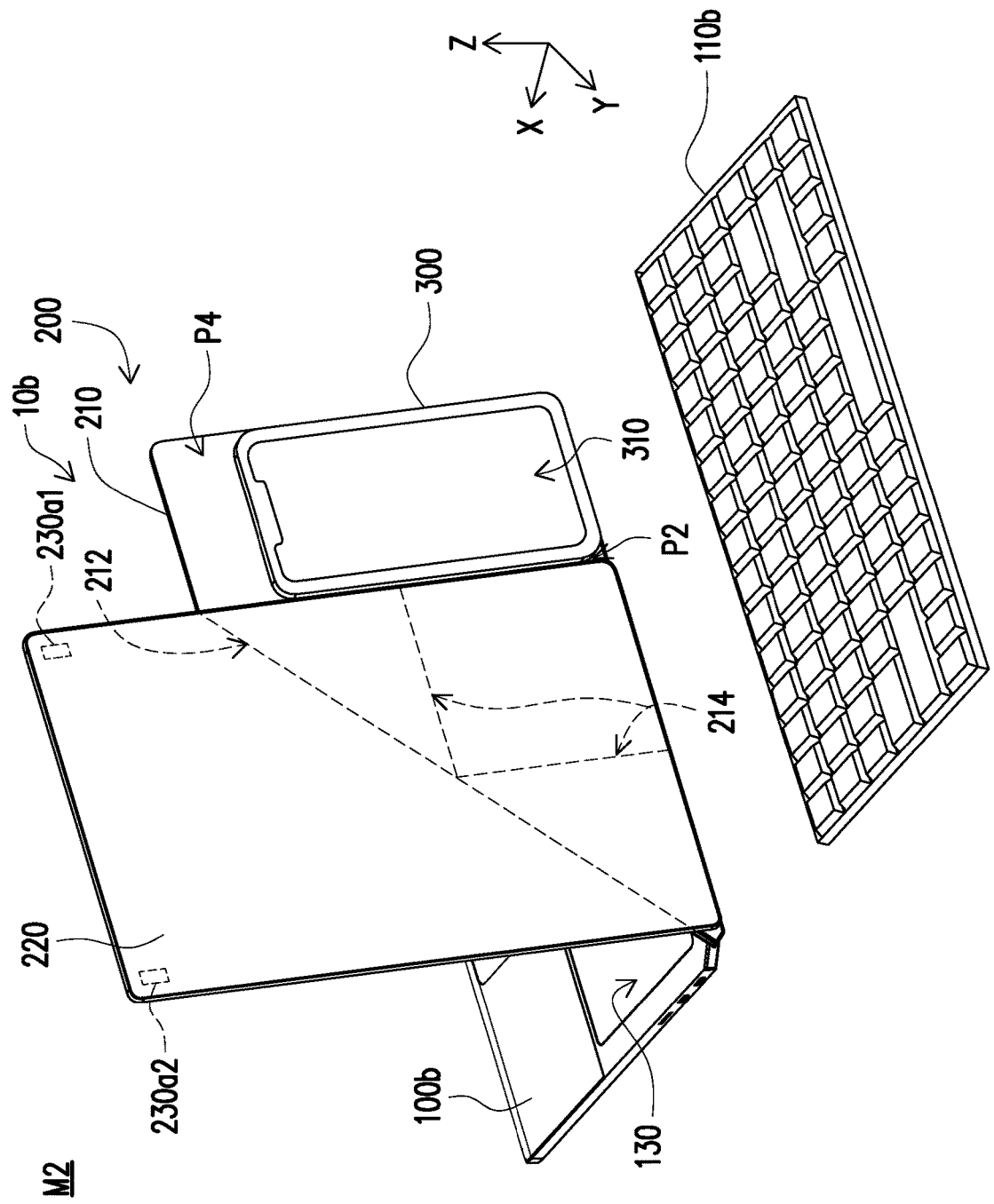
FIG. 7 is a schematic view of a portable electronic device according to another embodiment of the disclosure.

FIG. 7 is a schematic view of a portable electronic device according to another embodiment of the disclosure. The second body 200 of a portable electronic device 10b of FIG. 7 is in the second mode M2. Please refer to FIG. 6 and FIG. 7 at the same time. The portable electronic device 10b of the embodiment is similar to the above-mentioned embodiment, and the difference between the two is that a first body 100b of the embodiment includes a detachable keyboard 110b, and the detachable keyboard 110b is accommodated in an accommodating region 130. When switching the second body 200 to the second mode M2 or the third mode M3, the user may disassemble the detachable keyboard 110b from the accommodating region 130 of the first body 100b and move the detachable keyboard 110b to a suitable position.

In addition, the user may also dispose an additional electronic device to be used as an additional display screen of the portable electronic device 10b. In the embodiment, the additional electronic device is a mobile phone 300, but not limited thereto. For example, in other embodiments, the additional electronic device is a display. Here, the portable electronic device 10 may be wirelessly connected to the mobile phone 300. The mobile phone 300 may control the display panel 220 of the portable electronic device 10 or control a screen 310 of the mobile phone 300 through the portable electronic device 10, so that users can maintain a social distance.

For example, the detachable keyboard 110b may be used to quickly switch between or manipulate the display panel 220 of the portable electronic device 10b and the screen 310 of the mobile phone 300 at the same time. The user may use the display panel 220 as the main screen (for example, a data screen), and use the screen 310 to display an extended screen (for example, a video screen), a synchronized screen, or a secondary screen. Of course, the screen 310 may not be used to display a screen. Thereby, the portable electronic device 10b of the embodiment has various display functions and can support the additional electronic device.

FIG. 8A to FIG. 8D respectively illustrate support structures according to other embodiments of the disclosure. FIG.

Figure 8A:
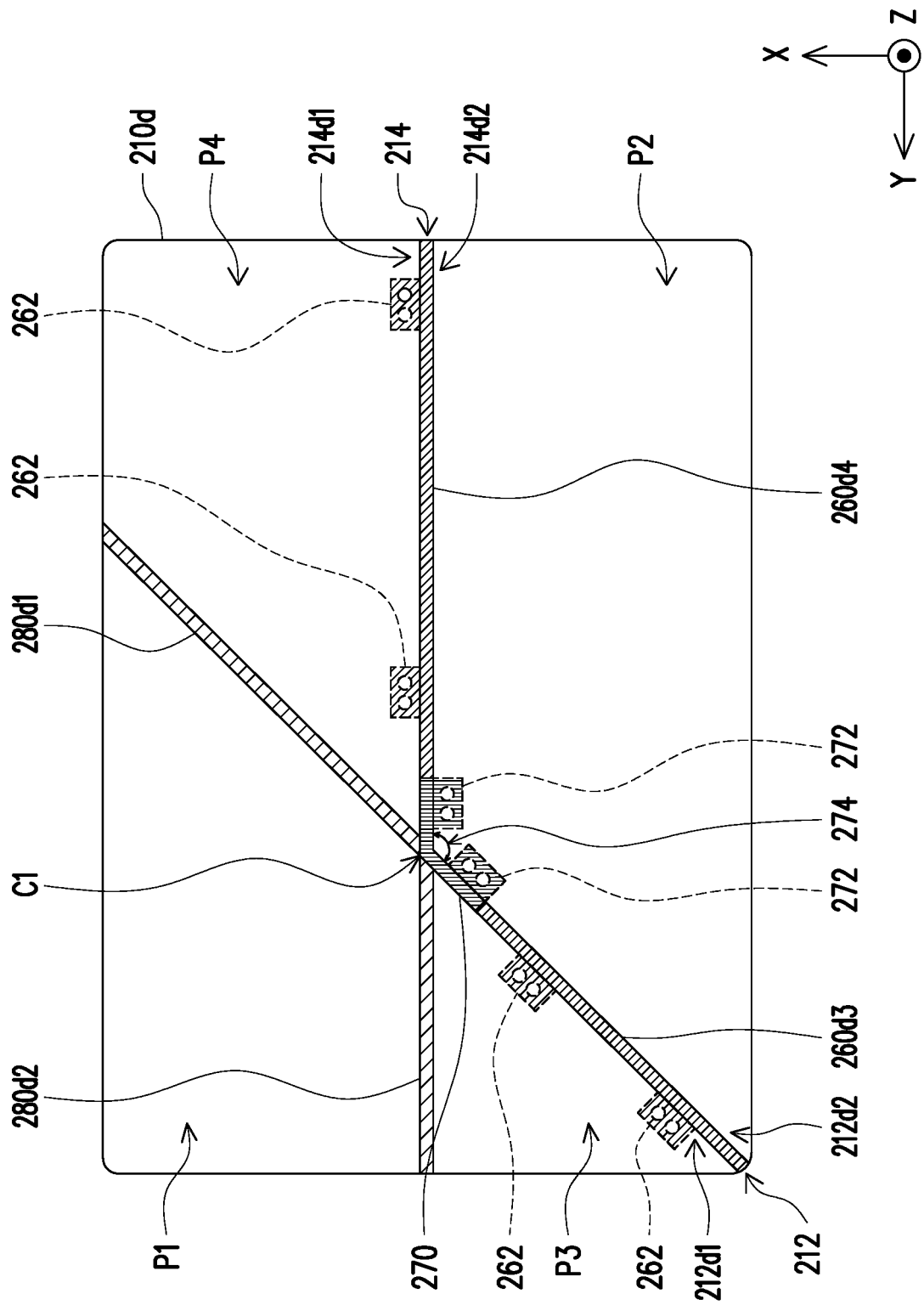
FIG. 8A to FIG. 8D respectively illustrate support structures according to other embodiments of the disclosure.
Figure 8B:
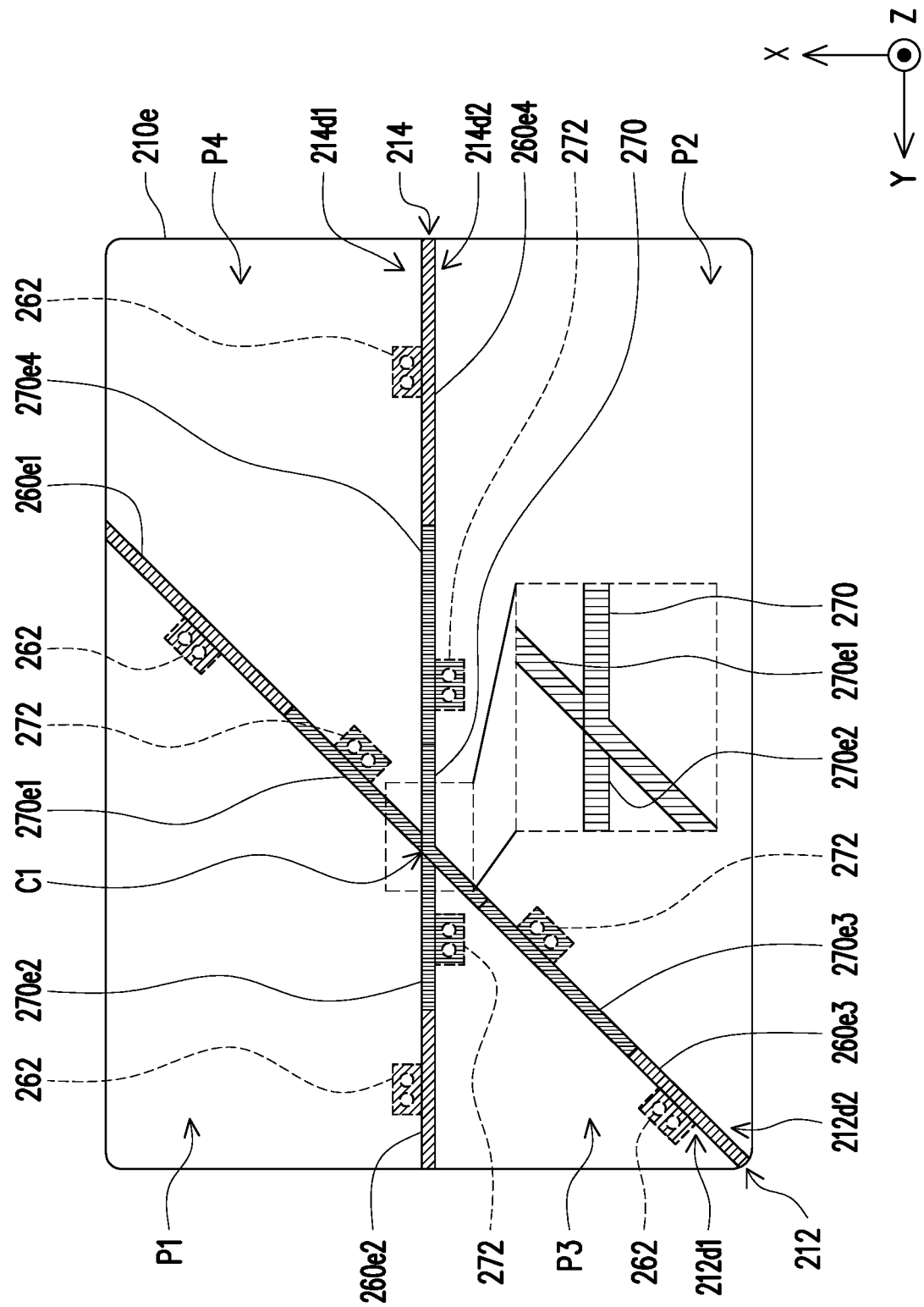
Figure 8C:
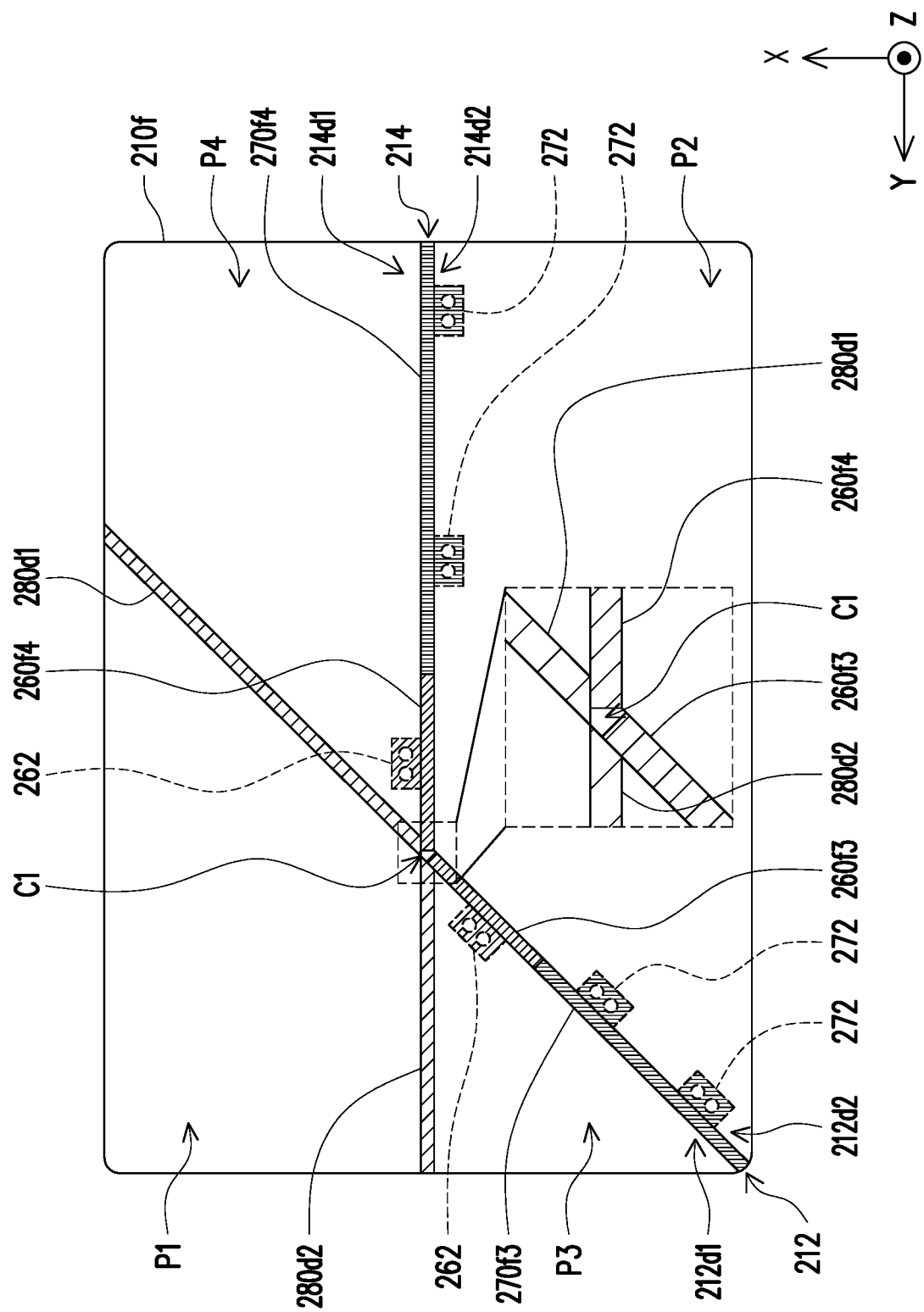
Figure 8D:
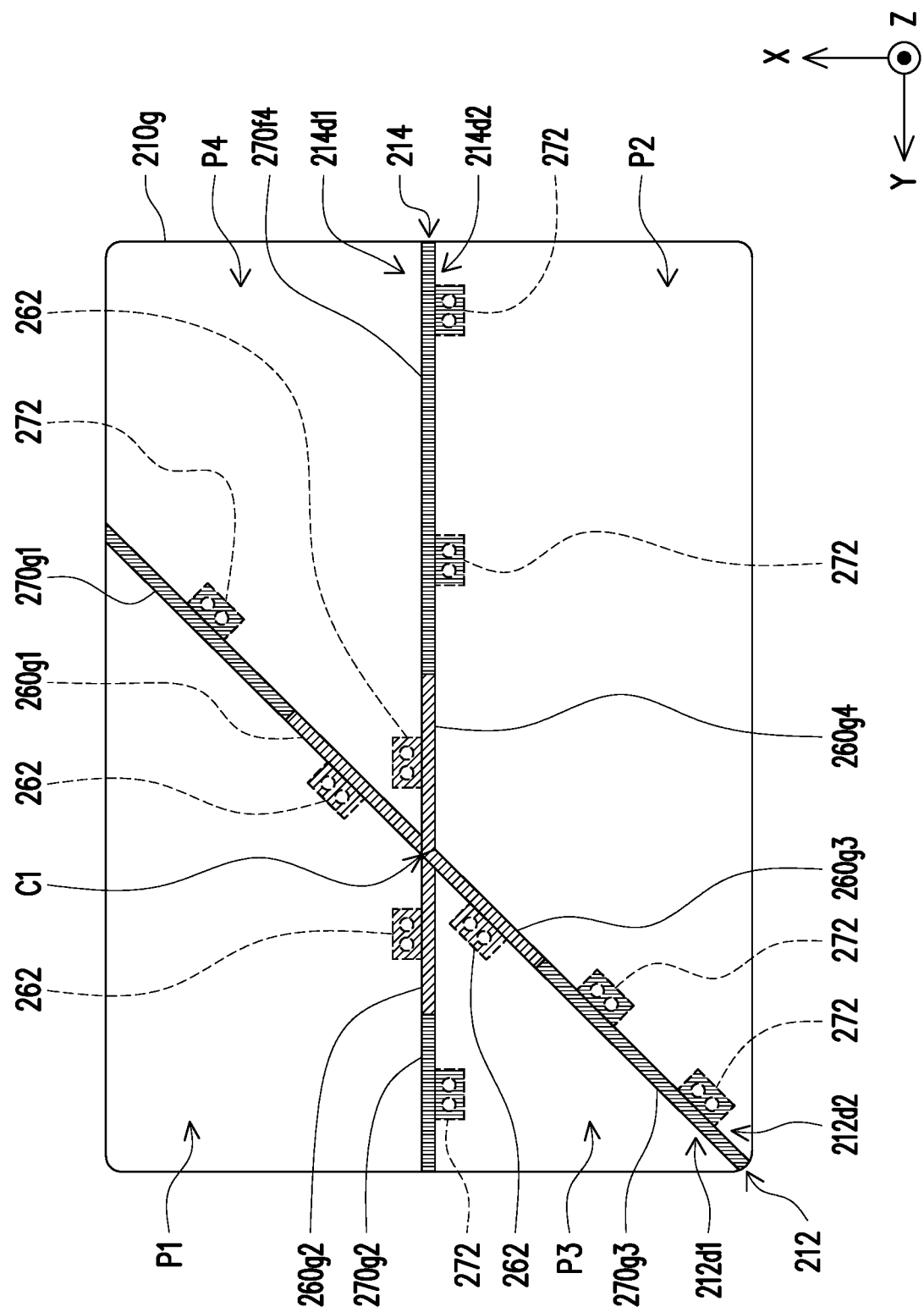

8A to FIG. 8D are top views of support structures 210d, 210e, 210f, and 210g. In order to clearly show a flipping shaft and a fixed shaft, some components are omitted in FIG. 8A to FIG. 8D. Please refer to FIG. 8A. The first bendable portion 212 of the support structure 210d of the embodiment includes a third rotating shaft 260d3, the second bendable portion 214 includes a fourth rotating shaft 260d4, and the portable electronic device 10 further includes an angle tube 270. Compared with the embodiment of FIG. 4, the advantage of the embodiment is that the third rotating shaft 260d3, the fourth rotating shaft 260d4, and the angle tube 270 may be used as reinforcement structures of the first bendable portion 212 and the second bendable portion 214 to increase the structural strength, durability, and stability of the support structure 210d. In addition, the support structure 210d may further include a torsion member (not shown) disposed corresponding to the third rotating shaft 260d3 and the fourth rotating shaft 260d4 to provide multi-angle opening and closing. For example, the support structure 210d may be maintained in the position shown in FIG. 2B or the position shown in FIG. 3A by the torsion member.

As shown in FIG. 8A, the third rotating shaft 260d3 and the fourth rotating shaft 260d4 are respectively fixed to the support structure 210d through multiple flipping fixing members 262, and the angle tube 270 is fixed to the support structure 210d through multiple fixing members 272. Specifically, the two flipping fixing members 262 of the third rotating shaft 260d3 are fixed to the third block P3, the two flipping fixing members 262 of the fourth rotating shaft 260d4 are fixed to the fourth block P4, and the two fixing members 272 of the angle tube 270 are fixed to the second block P2.

Here, the third rotating shaft 260d3 and the fourth rotating shaft 260d4 may be used as flipping shafts, and the angle tube 270 may be used as a fixed shaft. In other words, when switching the second body 200 between the first mode M1, the second mode M2, or the third mode M3, the flipping fixing members 262 of the flipping shafts (the third rotating shaft 260d3 and the fourth rotating shaft 260d4) flip along with the support structure 210d from one side of the first bendable portion 212 or the second bendable portion 214 to the other side. The fixing members 272 of the fixed shaft (the angle tube 270) do not flip along with the first bendable portion 212 or the second bendable portion 214.

For example, when flipping the second body 200 from the first mode M1 to the second mode M2 as shown in FIG. 2C, the third rotating shaft 260d3 flips along with the first bendable portion 212, so that a projection of the flipping fixing member 262 of the third rotating shaft 260d3 on the second body 200 moves from a first side 212d1 (the third block P3) of the first bendable portion 212 to a second side 212d2 (the second block P2). When flipping the second body 200 from the first mode M1 to the third mode M3 as shown in FIG. 3D, the fourth rotating shaft 260d4 flips along with the second bendable portion 214, so that a projection of the flipping fixing member 262 of the fourth rotating shaft 260d4 on the second body 200 moves from a first side 214d1 (the fourth block P4) of the second bendable portion 214 to a second side 214d2 (the second block P2).

In addition, when switching the second body 200 between the first mode M1, the second mode M2, or the third mode M3, one of the two fixing members 272 of the angle tube 270 is always located on the second side 212d2 (the second block P2) of the first bendable portion 212, and the other one of the fixing members 272 is always located on the second side 214d2 (the second block P2) of the second bendable portion 214. As shown in FIG. 8A, in the first mode M1, the flipping fixing members 262 of the flipping shafts (the third rotating shaft 260d3 and the fourth rotating shaft 260d4) and the fixing members 272 of the fixed shaft (the angle tube 270) are located on two opposite sides of the bendable portion.

The support structure 210d of the embodiment adopts a distributed unilateral uniaxial configuration. Specifically, the angle tube 270 is disposed at an intersection C1 of the first bendable portion 212 and the second bendable portion 214. The angle tube 270 has an obtuse angle 274 of less than 180 degrees, and the obtuse angle 274 faces the second block P2. A section of the angle tube 270 corresponds to the first bendable portion 212, and another section of the angle tube 270 corresponds to the second bendable portion 214. Since the fixed shaft (the angle tube 270) is disposed at the intersection C1, the flipping shafts (the third rotating shaft 260d3 and the fourth rotating shaft 260d4) are distributed at two ends of the fixed shaft, which is a distributed configuration. The first bendable portion 212 includes only one flipping shaft (the third rotating shaft 260d3) and the flipping shaft is disposed on the right side (between the second block P2 and the fourth block P4), and the second bendable portion 214 only includes one flipping shaft (the fourth rotating shaft 260d4) and the flipping shaft is disposed at the bottom (between the second block P2 and the third block P3), which is a unilateral uniaxial configuration. Such configuration requires fewer flipping shaft elements, which can reduce the cost.

Here, the portable electronic device 10 further includes a decorative tube. The decorative tube is disposed in a region of the bendable portion without the flipping shafts (the third rotating shaft 260d3 and the fourth rotating shaft 260d4) or the fixed shaft (the angle tube 270) to beautify the appearance of the second body 200 and for structural support. Specifically, a first decorative tube 280d1 is disposed along the first bendable portion 212 between the first block P1 and the fourth block P4, and a second decorative tube 280d2 is disposed along the second bendable portion 214 between the first block P1 and the third block P3. As shown in FIG. 8A, when the second body 200 is in the first mode M1, projections of the third rotating shaft 260d3, the fourth rotating shaft 260d4, the angle tube 270, the first decorative tube 280d1, and the second decorative tube 280d2 on the second body 200 do not overlap with each other, so that there is no structural interference between the flipping shafts, the fixed shaft, and the decorative tubes.

Please refer to FIG. 8A and FIG. 8B at the same time. The support structure 210e of the embodiment is similar to the above-mentioned embodiment, and the difference between the two is that the embodiment adopts a distributed bilateral biaxial configuration, so that the actions of flipping shafts (a first rotating shaft 260e1, a second rotating shaft 260e2, a third rotating shaft 260e3, and a fourth rotating shaft 260e4) are relatively balanced to prevent the phenomenon of twisted flip caused by an uneven force applied by the user.

Specifically, the first bendable portion 212 includes the first rotating shaft 260e1 and the third rotating shaft 260e3. The flipping fixing member 262 of the first rotating shaft 260e1 is fixed to the first block P1. The first rotating shaft 260e1 and the third rotating shaft 260e3 are disposed on two opposite sides (the left side and the right side) of the first bendable portion 212. The second bendable portion 214 includes the second rotating shaft 260e2 and the fourth rotating shaft 260e4. The flipping fixing member 262 of the second rotating shaft 260e2 is fixed to the first block P1. The second rotating shaft 260e2 and the fourth rotating shaft 260e4 are disposed on two opposite sides (the upper side and the lower side) of the second bendable portion 214. As shown in FIG. 8B, the flipping shafts (the first rotating shaft 260e1, the second rotating shaft 260e2, the third rotating shaft 260e3, and the fourth rotating shaft 260e4) are respectively disposed on two opposite sides of the first bendable portion 212 and the second bendable portion 214, and each bendable portion is provided with two flipping shafts, which is a bilateral biaxial configuration.

Here, the portable electronic device further includes multiple fixed shafts. The fixed shafts are disposed around the angle tube 270 along the first bendable portion 212 and the second bendable portion 214. A first fixed shaft 270e1 and a third fixed shaft 270e3 are disposed along the first bendable portion 212, the fixing member 272 of the first fixed shaft 270e1 is fixed to the fourth block P4, and the fixing member 272 of the third fixed shaft 270e3 is fixed to the second block P2. A second fixed shaft 270e2 and a fourth fixed shaft 270e4 are disposed along the second bendable portion 214, the fixing member 272 of the second fixed shaft 270e2 is fixed to the third block P3, and the fixing member 272 of the fourth fixed shaft 270e4 is fixed to the second block P2. As shown in the enlarged view of FIG. 8B, the angle tube 270 is separated from the first fixed shaft 270e1 and the second fixed shaft 270e2 to ensure that there is no structural interference.

In the embodiment, the first fixed shaft 270e1, the second fixed shaft 270e2, the third fixed shaft 270e3, and the fourth fixed shaft 270e4 provide additional support for the support structure 210e to improve the structural strength and the stability when flipping of the support structure 210e. Accordingly, the support structure 210e of the embodiment has similar technical effects to the above-mentioned embodiment.

Please refer to FIG. 8A and FIG. 8C at the same time. The support structure 210f of the embodiment is similar to the above-mentioned embodiment, and the difference between the two is that the embodiment adopts a centralized unilateral uniaxial configuration. Specifically, the embodiment does not include the angle tube 270 (shown in FIG. 8A), and a third rotating shaft 260f3 and a fourth rotating shaft 260f4 are disposed around the intersection C1 of the first bendable portion 212 and the second bendable portion 214, which is a centralized configuration. As shown in the enlarged view of FIG. 8C, the third rotating shaft 260f3 and the fourth rotating shaft 260f4 are disconnected and avoid each other at the intersection C1 to prevent structural interference. A third fixed shaft 270f3 and a fourth fixed shaft 270f4 are respectively disposed beside the third rotating shaft 260f3 and the fourth rotating shaft 260f4 and are away from the intersection C1. Accordingly, the support structure 210f of the embodiment has similar technical effects to the above-mentioned embodiment.

Please refer to FIG. 8B and FIG. 8D at the same time. The support structure 210g of the embodiment is similar to the above-mentioned embodiment, and the difference between the two is that the embodiment adopts a centralized bilateral biaxial configuration. Specifically, the embodiment does not include the angle tube 270 (shown in FIG. 8A), flipping shafts (a first rotating shaft 260g1, a second rotating shaft 260g2, a third rotating shaft 260g3, and a fourth rotating shaft 260g4) are disposed around the intersection C1 of the first bendable portion 212 and the second bendable portion 214, and the flipping shafts are disconnected and avoid each other to prevent structural interference. A first fixed shaft 270g1, a second fixed shaft 270g2, a third fixed shaft 270g3, and a fourth fixed shaft 270g4 are respectively disposed beside the first rotating shaft 260g1, the second rotating shaft 260g2, the third rotating shaft 260g3, and the fourth rotating shaft 260g4, and are away from the intersection C1. Accordingly, the support structure 210g of the embodiment has similar technical effects to the above-mentioned embodiment.

FIG. 9A and FIG. 9B are schematic views of wiring of the portable electronic device of FIG. 1B in different states. FIG. 9A shows the portable electronic device 10 bent along the first bendable portion 212, and FIG. 9B shows the portable electronic device 10 in the close state (shown in FIG. 1A). Please refer to FIG. 9A and FIG. 9B at the same time. The portable electronic device 10 of the embodiment includes a wiring 400. The first body 100 has a main circuit board 120 and the second body 200 has a control circuit board 250. The control circuit board 250 is disposed on the display panel 220. The main circuit board 120 and the control circuit board 250 are connected through the wiring 400. The wiring 400 extends from the first body 100 (the main circuit board 120) through the rotating shaft RS, the support structure 210, and the display panel 220 to the control circuit board 250. In the embodiment, the wiring 400 is covered in the soft layer 216 (shown in FIG. 4) of the support structure 210, so that the wiring 400 is not exposed.

As shown in FIG. 9A, the control circuit board 250 of the embodiment is disposed at the lower end 224 of the display panel 220. When the second body 200 is in the first mode M1, the lower end 224 is adjacent to the first body 100 (shown in FIG. 1B). The wiring 400 has a first segment 410a1, a second segment 410a2, a third segment 410a3, and an extended segment 420. The extended segment 420 is disposed in the display panel 220 and is connected to the control circuit board 250. The first segment 410a1, the second segment 410a2, and the third segment 410a3 are disposed in the support structure 210.

Specifically, the second segment 410a2 is disposed in the second block P2, one end 412 of the second segment 410a2 is connected to the first body 100 (the main circuit board 120), and the second segment 410a2 extends toward the direction of the upper end 222 and is connected to the third segment 410a3. The third segment 410a3 is disposed in the third block P3 to connect the first segment 410a1 and the second segment 410a2. The first segment 410a1 is disposed in the first block P1, and one end 414 of the first segment 410a1 is connected from the upper end 222 to the extended segment 420 in the display panel 220. So far, the electrical connection between the main circuit board 120 of the first body 100 and the control circuit board 250 of the display panel 220 is completed. In short, the wiring 400 is bent at the first block P1 and extends to the display panel 220, so that the length of the wiring 400 is increased. The advantage is that the control circuit board 250 of the existing display panel 220 is mostly disposed at the lower end 224, so the existing configuration is continued to be used, a width W1 of an upper portion and a width W2 of a lower portion of a frame 226 of the display panel 220 can be relatively evened, and the manufacturing cost of the portable electronic device 10 can be reduced.

Figure 10B:
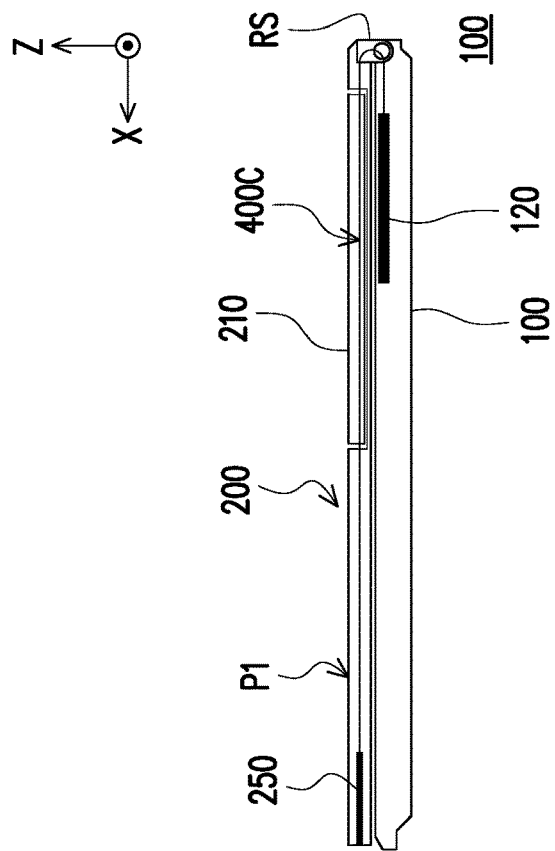
FIG. 10A and FIG. 10B are schematic views of wiring of a portable electronic device at different viewing angles according to another embodiment of the disclosure.
Figure 10A:
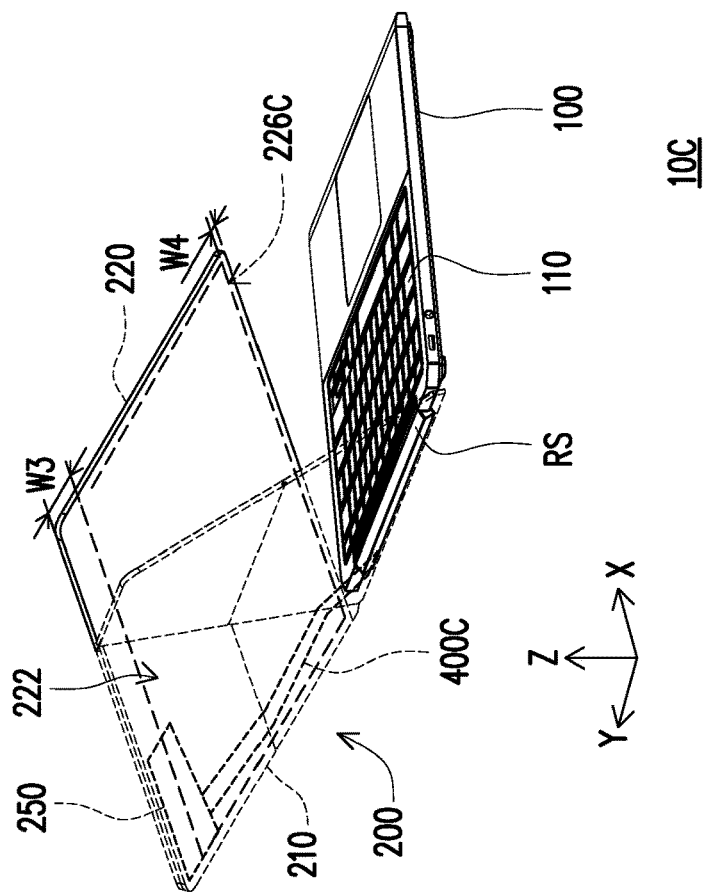

FIG. 10A and FIG. 10B are schematic views of wiring of a portable electronic device at different viewing angles according to another embodiment of the disclosure. FIG. 10A shows a portable electronic device 10C bent along the first bendable portion 212, and FIG. 10B shows the portable electronic device 10C in the close state. Please refer to FIG. 9A and FIG. 10A at the same time. The portable electronic device 10C of the embodiment is similar to the above-mentioned embodiment, and the difference between the two is that the control circuit board 250 of the embodiment is disposed at the upper end 222 of the display panel 220. As shown in FIG. 10A, a wiring 400c extends from the first body 100 (the main circuit board 120) to the upper end 222 to be connected to the control circuit board 250. As shown in FIG. 10B, the wiring 400C directly extends to the control circuit board 250, so that a width W3 of an upper portion and a width W4 of a lower portion of a frame 226C of the display panel 220 are less even. The advantage is that the length of the wiring 400C is shorter than the length of the wiring 400. Therefore, it can be seen that the control circuit board 250 is disposed at the lower end 224 (shown in FIG. 9A) or the upper end 222 (shown in FIG. 10A) and does not affect the function of the display panel 220. The user can choose a suitable configuration according to requirements.

In summary, the portable electronic device of the disclosure may switch the second body between the first mode, the second mode, and the third mode through the first bendable portion and the second bendable portion, so that the display panel may display horizontally or display vertically, and the effects of flipping the display direction of the display panel 360 degrees and expanding the usage scenario of the portable electronic device can be achieved. There is no need to lift the entire device or install an additional 360-degree rotating shaft when switching the usage mode, so that the mode switching of the portable electronic device can be more convenient and quicker, and the manufacturing cost can be reduced. In addition, the portable electronic device further includes the expansion module and the detachable keyboard, which can implement more diversified display and operation, and improve the usage convenience.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A portable electronic device, comprising:
a first body; and
a second body, comprising a support structure and a display panel,
wherein the support structure is pivotally connected to the first body and is connected to the display panel,
wherein the support structure has a first bendable portion, and an included angle between the first bendable portion and an edge of the support structure is 45 degrees,
the support structure is adapted to be bent along the first bendable portion, so that the second body switches between a first mode and a second mode relative to the first body,
wherein the support structure has a second bendable portion parallel to the edge of the support structure,
wherein the first bendable portion and the second bendable portion are staggered with each other to divide the support structure into a first block, a second block, a third block, and a fourth block.

2. The portable electronic device according to claim 1, wherein when the second body is closed onto the first body, the display panel is located between the first body and the support structure.

3. The portable electronic device according to claim 1, wherein the first bendable portion divides the support structure into the first block and the second block.

4. The portable electronic device according to claim 1, wherein when the second body is closed onto the first body, the support structure is located between the first body and the display panel.

5. The portable electronic device according to claim 1, wherein a distance between the second bendable portion and the edge is equal to a distance between the second bendable portion and another edge.

6. The portable electronic device according to claim 1, wherein the first block is connected to the display panel, and the second block is pivotally connected to the first body.

7. The portable electronic device according to claim 1, wherein the first block and the third block are respectively located on two opposite sides of the second bendable portion, and the first block and the fourth block are respectively located on two opposite sides of the first bendable portion.

8. The portable electronic device according to claim 1, wherein an area of the second block is greater than an area of the fourth block, the area of the fourth block is greater than an area of the first block, and the area of the first block is greater than an area of the third block.

9. The portable electronic device according to claim 1, wherein the support structure comprises a soft layer connecting the first block, the second block, the third block, and the fourth block.

10. The portable electronic device according to claim 9, wherein the soft layer is disposed in the first block, the second block, the third block, and the fourth block.

11. The portable electronic device according to claim 9, wherein a gap between the first block, the second block, the third block, and the fourth block exposes at least part of the soft layer.

12. The portable electronic device according to claim 11, wherein at least part of the soft layer forms the first bendable portion and the second bendable portion.

13. The portable electronic device according to claim 9, wherein the first block is located between the display panel and at least part of the soft layer.

14. The portable electronic device according to claim 9, wherein at least part of the soft layer is located between the display panel and the first block.

15. The portable electronic device according to claim 1, wherein when the second body is in the first mode, the first block and the second block do not overlap with each other, and when the second body is in the second mode, the first block overlaps with the second block and the fourth block, and the third block overlaps with the second block.

16. The portable electronic device according to claim 1, wherein the support structure is adapted to be bent along the second bendable portion, so that the second body switches between the first mode and a third mode relative to the first body.

17. The portable electronic device according to claim 16, wherein when the second body is in the first mode, the first block, the second block, the third block, and the fourth block do not overlap with each other, and when the second body is in the third mode, the first block overlaps with the second block and the third block, and the fourth block overlaps with the second block.

18. The portable electronic device according to claim 16, wherein the second body comprises a plurality of magnetic members, the magnetic members are respectively disposed on the support structure and the display panel, the second body is maintained in the first mode, the second mode, or the third mode by magnetic attraction between at least two of the magnetic members.

19. The portable electronic device according to claim 16, wherein the second body comprises a plurality of sensors disposed on the support structure or the display panel, and the sensors are adapted to sense whether the second body is the first mode, the second mode, or the third mode.

20. The portable electronic device according to claim 16, further comprising an expansion module disposed in the second block or the fourth block.

21. The portable electronic device according to claim 20, wherein when the second body is in the first mode or the third mode, the expansion module is closed, when the second body is in the second mode, the expansion module does not overlap with the display panel, when the second body is in the second mode, the expansion module is opened.

22. The portable electronic device according to claim 20, wherein the expansion module is a contact function module or a hotkeys module, and the contact function module is a wireless charging module or a data transmission module.

23. The portable electronic device according to claim 1, wherein the first body comprises a main circuit board, the display panel comprises a control circuit board, and the portable electronic device further comprises a wiring, wherein the wiring connects the main circuit board and the control circuit board through the support structure.

24. The portable electronic device according to claim 23, wherein the wiring has a first segment disposed in the first block and connected to the control circuit board, the wiring has a second segment, the second segment is disposed in the second block to connect to the main circuit board, the wiring has a third segment, and the third segment is disposed in the third block to connect the first segment and the second segment.

25. The portable electronic device according to claim 23, wherein the wiring has an extended segment disposed in the display panel and connected to the control circuit board, the wiring has a first segment, and the first segment is disposed in the first block and is connected to the extended segment.

26. The portable electronic device according to claim 1, wherein the first bendable portion comprises a third rotating shaft fixed to the third block, and the second bendable portion comprises a fourth rotating shaft fixed to the fourth block.

27. The portable electronic device according to claim 26, wherein the first bendable portion comprises a first rotating shaft fixed to the first block.

28. The portable electronic device according to claim 26, wherein the second bendable portion comprises a second rotating shaft fixed to the first block.

29. The portable electronic device according to claim 26, further comprising an angle tube fixed to the second block, a section of the angle tube corresponds to the first bendable portion, and another section of the angle tube corresponds to the second bendable portion.

30. The portable electronic device according to claim 26, further comprising a first decorative tube disposed between the first block and the fourth block, and a second decorative tube disposed between the first block and the third block.

\* \* \* \* \*